United States Patent
Fu et al.

(10) Patent No.: US 10,354,411 B2
(45) Date of Patent: Jul. 16, 2019

(54) METHODS, SYSTEMS AND APPARATUS FOR SEGMENTING OBJECTS

(71) Applicant: Symbol Technologies, LLC, Lincolnshire, IL (US)

(72) Inventors: Bo Fu, Wheeling, IL (US); Yan Zhang, Buffalo Grove, IL (US); Ye Gu, Rockville, MD (US); Jay J. Williams, Glenview, IL (US); Kevin J. O'Connell, Palatine, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 118 days.

(21) Appl. No.: 15/385,113

(22) Filed: Dec. 20, 2016

(65) Prior Publication Data

US 2018/0174325 A1     Jun. 21, 2018

(51) Int. Cl.
*G06K 9/00* (2006.01)
*G06T 7/73* (2017.01)
(Continued)

(52) U.S. Cl.
CPC .............. *G06T 7/75* (2017.01); *G01B 11/02* (2013.01); *G06K 9/00208* (2013.01);
(Continued)

(58) Field of Classification Search
CPC ..... G06T 7/75; G06T 7/90; G06T 7/11; G06T 2207/10028; G06T 2207/10024; G06T 2210/12; G06K 9/4652; G06K 9/00208
See application file for complete search history.

(56) References Cited

U.S. PATENT DOCUMENTS

| | | |
|---|---|---|
| 5,408,322 A | 4/1995 | Hsu et al. |
| 5,988,862 A | 11/1999 | Kacyra et al. |

(Continued)

FOREIGN PATENT DOCUMENTS

| | | |
|---|---|---|
| CA | 2835830 A1 | 11/2012 |
| CN | 104200086 A | 12/2014 |

(Continued)

OTHER PUBLICATIONS

"Fair Billing with Automatic Dimensioning" pp. 1-4, undated, Copyright Mettler-Toledo International Inc.
(Continued)

*Primary Examiner* — Carol Wang
(74) *Attorney, Agent, or Firm* — Yuri Astvatsaturov

(57) ABSTRACT

Methods, systems and apparatus for segmenting objects are provided. A controller: receives, from one or more sensors, a 3D representation of a scene that includes an object represented by a 3D model; determines an orientation of a 2D image in the 3D representation by matching the 2D image with a corresponding region of the 3D representation; determines a first portion of the 3D representation that corresponds to a subset of the 3D model of the object from: the orientation of the 2D image in the 3D representation; and predetermined matching data representative of a matching of the 2D image with a respective corresponding region of the 3D model, each of the 3D model, the 2D image, and the predetermined matching data stored in a memory accessible to the controller; segments the first portion of the 3D representation from a second portion of the 3D representation.

16 Claims, 15 Drawing Sheets

(51) Int. Cl.
    *G06T 7/11* (2017.01)
    *G06K 9/62* (2006.01)
    *G01B 11/02* (2006.01)
    *G01B 11/24* (2006.01)

(52) U.S. Cl.
    CPC ............ *G06K 9/6201* (2013.01); *G06T 7/11* (2017.01); *G06T 7/74* (2017.01); *G01B 11/24* (2013.01); *G06T 2207/10024* (2013.01); *G06T 2207/10028* (2013.01); *G06T 2207/30112* (2013.01)

(56) References Cited

U.S. PATENT DOCUMENTS

| | | |
|---|---|---|
| 6,115,114 A | 9/2000 | Berg et al. |
| 6,995,762 B1 | 2/2006 | Pavlidis et al. |
| 7,137,207 B2 | 11/2006 | Armstrong et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,726,575 B2 | 6/2010 | Wang et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,199,977 B2 | 6/2012 | Krishnaswamy et al. |
| 8,265,895 B2 | 9/2012 | Willins et al. |
| 8,284,988 B2 | 10/2012 | Sones et al. |
| 8,463,079 B2 | 6/2013 | Ackley et al. |
| 8,479,996 B2 | 7/2013 | Barkan et al. |
| 8,542,252 B2 | 9/2013 | Perez et al. |
| 8,599,303 B2 | 12/2013 | Stettner |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,989,342 B2 | 3/2015 | Liesenfelt et al. |
| 9,007,601 B2 | 4/2015 | Steffey et al. |
| 9,070,285 B1 | 6/2015 | Ramu |
| 9,129,277 B2 | 9/2015 | MacIntosh |
| 9,329,269 B2 | 5/2016 | Zeng |
| 9,396,554 B2 | 7/2016 | Williams et al. |
| 9,400,170 B2 | 7/2016 | Steffey |
| 9,549,125 B1 | 1/2017 | Goyal et al. |
| 9,562,971 B2 | 2/2017 | Shenkar et al. |
| 9,600,892 B2 | 3/2017 | Patel et al. |
| 9,778,388 B1 | 10/2017 | Connor |
| 9,791,862 B1 | 10/2017 | Connor |
| 2001/0041948 A1 | 11/2001 | Ross et al. |
| 2002/0164236 A1 | 7/2002 | Fukuhara et al. |
| 2002/0158453 A1 | 10/2002 | Levine |
| 2003/0199748 A1* | 10/2003 | Camus ................ A61B 8/13 600/407 |
| 2004/0240754 A1 | 2/2004 | Smith et al. |
| 2005/0016004 A1 | 1/2005 | Armstrong et al. |
| 2005/0114059 A1 | 5/2005 | Chang et al. |
| 2006/0106742 A1 | 5/2006 | Bocchicchio et al. |
| 2007/0074410 A1 | 4/2007 | Armstrong et al. |
| 2007/0272732 A1 | 11/2007 | Hindmon |
| 2008/0238919 A1 | 10/2008 | Pack |
| 2009/0088975 A1 | 4/2009 | Sato et al. |
| 2009/0103773 A1 | 4/2009 | Wheeler et al. |
| 2009/0152391 A1 | 6/2009 | McWhirk |
| 2009/0207171 A1* | 8/2009 | Feilkas ................ G06T 7/0089 345/427 |
| 2009/0323121 A1 | 12/2009 | Valkenburg et al. |
| 2010/0026804 A1 | 2/2010 | Tanizaki et al. |
| 2010/0091094 A1 | 4/2010 | Sekowski |
| 2010/0118116 A1 | 5/2010 | Tomasz |
| 2010/0131234 A1 | 5/2010 | Stewart et al. |
| 2010/0208039 A1 | 8/2010 | Stettner |
| 2010/0209013 A1* | 8/2010 | Minear ................ G06T 7/32 382/260 |
| 2010/0295850 A1 | 11/2010 | Katz |
| 2010/0315412 A1 | 12/2010 | Sinha et al. |
| 2011/0047636 A1 | 2/2011 | Stachon et al. |
| 2011/0052043 A1 | 3/2011 | Hung |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0286007 A1 | 11/2011 | Panzgrazio et al. |
| 2011/0310088 A1 | 12/2011 | Adabala et al. |
| 2012/0075342 A1 | 3/2012 | Choubassi et al. |
| 2012/0179621 A1 | 7/2012 | Moir et al. |
| 2012/0185112 A1 | 7/2012 | Sung et al. |
| 2012/0209553 A1 | 8/2012 | Doytchinov et al. |
| 2012/0236119 A1 | 9/2012 | Rhee |
| 2012/0249802 A1 | 10/2012 | Taylor |
| 2012/0250978 A1 | 10/2012 | Taylor |
| 2012/0287249 A1 | 11/2012 | Choo et al. |
| 2013/0144565 A1 | 6/2013 | Miller |
| 2013/0156292 A1 | 6/2013 | Chang et al. |
| 2013/0162806 A1 | 6/2013 | Ding et al. |
| 2013/0228620 A1 | 9/2013 | Ahem et al. |
| 2013/0236089 A1 | 9/2013 | Litvak et al. |
| 2013/0293532 A1* | 11/2013 | Vaddadi ................ G06T 15/005 345/419 |
| 2013/0299306 A1 | 11/2013 | Jiang et al. |
| 2013/0299313 A1 | 11/2013 | Baek, IV et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi |
| 2014/0028837 A1 | 1/2014 | Gao et al. |
| 2014/0049616 A1 | 2/2014 | Stettner |
| 2014/0098094 A1 | 4/2014 | Neumann |
| 2014/0100813 A1 | 4/2014 | Showering |
| 2014/0104413 A1 | 4/2014 | McCloskey et al. |
| 2014/0176679 A1 | 6/2014 | Lehning |
| 2014/0192050 A1 | 7/2014 | Qiu |
| 2014/0267614 A1 | 9/2014 | Ding et al. |
| 2014/0267688 A1 | 9/2014 | Aich et al. |
| 2014/0300637 A1 | 10/2014 | Fan et al. |
| 2014/0351073 A1 | 11/2014 | Murphy et al. |
| 2015/0015602 A1 | 1/2015 | Beaudoin |
| 2015/0088618 A1 | 3/2015 | Basir et al. |
| 2015/0092066 A1 | 4/2015 | Geiss et al. |
| 2015/0106403 A1 | 4/2015 | Haverinen et al. |
| 2015/0138310 A1* | 5/2015 | Fan ................ G06K 9/00201 348/36 |
| 2015/0154467 A1 | 6/2015 | Feng |
| 2015/0161793 A1 | 6/2015 | Takahashi |
| 2015/0181198 A1 | 6/2015 | Baele et al. |
| 2015/0213590 A1* | 7/2015 | Brown ................ G06T 17/05 345/419 |
| 2015/0352721 A1* | 12/2015 | Wicks ................ B25J 9/1664 700/228 |
| 2015/0379704 A1 | 12/2015 | Chandrasekar et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0012588 A1 | 4/2016 | Taguchi |
| 2016/0107690 A1 | 4/2016 | Oyama et al. |
| 2016/0150217 A1 | 5/2016 | Popov |
| 2016/0156898 A1 | 6/2016 | Ren et al. |
| 2016/0163067 A1 | 7/2016 | Williams |
| 2017/0004649 A1 | 1/2017 | Collet Romea et al. |
| 2017/0041553 A1 | 2/2017 | Cao et al. |
| 2017/0150129 A1 | 5/2017 | Pangrazio |
| 2017/0227647 A1 | 8/2017 | Baik |
| 2017/0228885 A1 | 8/2017 | Baumgartner |
| 2017/0228940 A1* | 8/2017 | Kutliroff ................ G06T 19/20 |
| 2017/0236261 A1* | 8/2017 | Finch ................ G06K 9/00208 382/152 |

(56) References Cited

U.S. PATENT DOCUMENTS

FOREIGN PATENT DOCUMENTS

| EP | 2439487 A1 | 4/2012 |
|---|---|---|
| EP | 2562688 A2 | 2/2013 |
| EP | 2693362 A1 | 2/2014 |
| WO | 2003/002935 A1 | 1/2003 |
| WO | 2008/057504 A2 | 5/2008 |
| WO | 2008/154611 A2 | 12/2008 |
| WO | 2011/123057 A1 | 10/2011 |
| WO | 2013/165674 | 11/2013 |
| WO | 2014/092552 A2 | 6/2014 |
| WO | 2015/127503 A1 | 9/2015 |
| WO | 2016/020038 A1 | 2/2016 |

OTHER PUBLICATIONS

"Swift Dimension" Trademark Omniplanar, Copyright 2014.

"Plane Detection in Point Cloud Data" dated Jan. 25, 2010 by Michael Ying Yang and Wolfgang Forstner, Technical Report 1, 2010, University of Bonn.

Lecking et al., "Localization in a wide range of industrial environments using relative 3D ceiling features," IEEE, pp. 333-337, Sep. 15, 2008.

Carreira et al., "Enhanced PCA-based localization using depth maps with missing data," IEEE, pp. 1-8, Apr. 24, 2013.

Clayton et al., U.S. Appl. No. 15/358,810, filed Nov. 22, 2016.

Dubois, M., et al., "A comparison of geometric and energy-based point cloud semantic segmentation methods," European Conference on Mobile Robots (ECMR), vol., No., pp. 88-93, Sep. 25-27, 2013.

Lari, Z., et al., "An adaptive approach for segmentation of 3D laser point cloud." International Archives of the Photogrammetry, Remote Sensing and Spatial Information Sciences, vol. XXXVIII-5/W12, 2011, ISPRS Calgary 2011 Workshop, Aug. 29-31, 2011, Calgary, Canada.

Rusu, et al. "Spatial change detection on unorganized point cloud data," PCL Library, retrieved from Internet on Aug. 19, 2016 [http://pointclouds.org/documentation/tutorials/octree_change.php].

Tahir, Rabbani, et al., "Segmentation of point clouds using smoothness constraint," International Archives of Photogrammetry, Remote Sensing and Spatial Information Sciences 36.5 (Sep. 2006): 248-253.

Golovinskiy, Aleksey, et al. "Min-cut based segmentation of point clouds." Computer Vision Workshops (ICCV Workshops), 2009 IEEE 12th International Conference on. IEEE, 2009.

Douillard, Bertrand, et al. "On the segmentation of 3D LIDAR point clouds." Robotics and Automation (ICRA), 2011 IEEE International Conference on IEEE, 2011.

Puwein, J., et al., "Robust multi-view camera calibration for wide-baseline camera networks," in IEEE Workshop on Applications of Computer Vision (WACV), Jan. 2011.

Datta, A., et al., "Accurate camera calibration using iterative refinement of control points," in Computer Vision Workshops (ICCV Workshops), 2009.

Olson, Clark F., et al. "Wide-Baseline Stereo Vision for Terrain Mapping" in Machine Vision and Applications, Aug. 2010.

Rusu, et al., "How to incrementally register pairs of clouds," PCL Library, retrieved from the Internet on Aug. 22, 2016 from <http://pointclouds.org/documentation/tutorials/pairwise_incremental_registration.php>.

Zheng et al., U.S. Appl. No. 15/131,856, filed Apr. 18, 2016.

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Schnabel et al. "Efficient RANSAC for Point-Cloud Shape Detection", vol. 0, No. 0, pp. 1-12.

Buenaposada et al. "Real-time tracking and estimation of plane pose" Proceedings of the ICPR (Aug. 2002) vol. II, IEEE pp. 697-700.

International Search Report and Written Opinion for International Patent Application No. PCT/US2017/024847 dated Jul. 7, 2017.

Ziang Xie et al., "Multimodal Blending for High-Accuracy Instance Recognition", 2013 IEEE/RSJ International Conference on Intelligent Robots and Systems, pp. 2214-2221.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.

Federico Tombari et al. "Multimodal cue integration through Hypotheses Verification for RGB-D object recognition and 6DOF pose estimation", IEEE International Conference on Robotics and Automation, Jan. 2013.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

U.S. Appl. No. 15/008,710, filed Jan. 28, 2016.
U.S. Appl. No. 15/015,228, filed Feb. 4, 2016.
U.S. Appl. No. 15/078,074, filed Mar. 23, 2016.
U.S. Appl. No. 15/242,126, filed Aug. 19, 2016.

International Search Report and Written Opinion for International Application No. PCT/US2017/062255 dated Jan. 30, 2018.

* cited by examiner

METHODS, SYSTEMS AND APPARATUS FOR SEGMENTING OBJECTS

FIELD OF THE DISCLOSURE

This disclosure relates generally to image processing systems and, more particularly, to methods, systems and apparatus for segmenting objects.

BACKGROUND

Transportation and logistics systems include planning operations that improve efficiency and accuracy of certain delivery services. For example, when a plurality of objects (e.g., packages) are going to be loaded into a container (e.g. delivery trucks) by a forklift, and the like, a transportation and logistics system may determine which objects are to be transported via which container and how the objects are to be loaded into the containers. Such systems are better able to execute the planning operations by gaining knowledge of one or more dimensions of the objects to be transported. Such dimensioning is complicated when the objects are located on a vehicle, such as a forklift, and the like.

DETAILED DESCRIPTION

Figure 1:
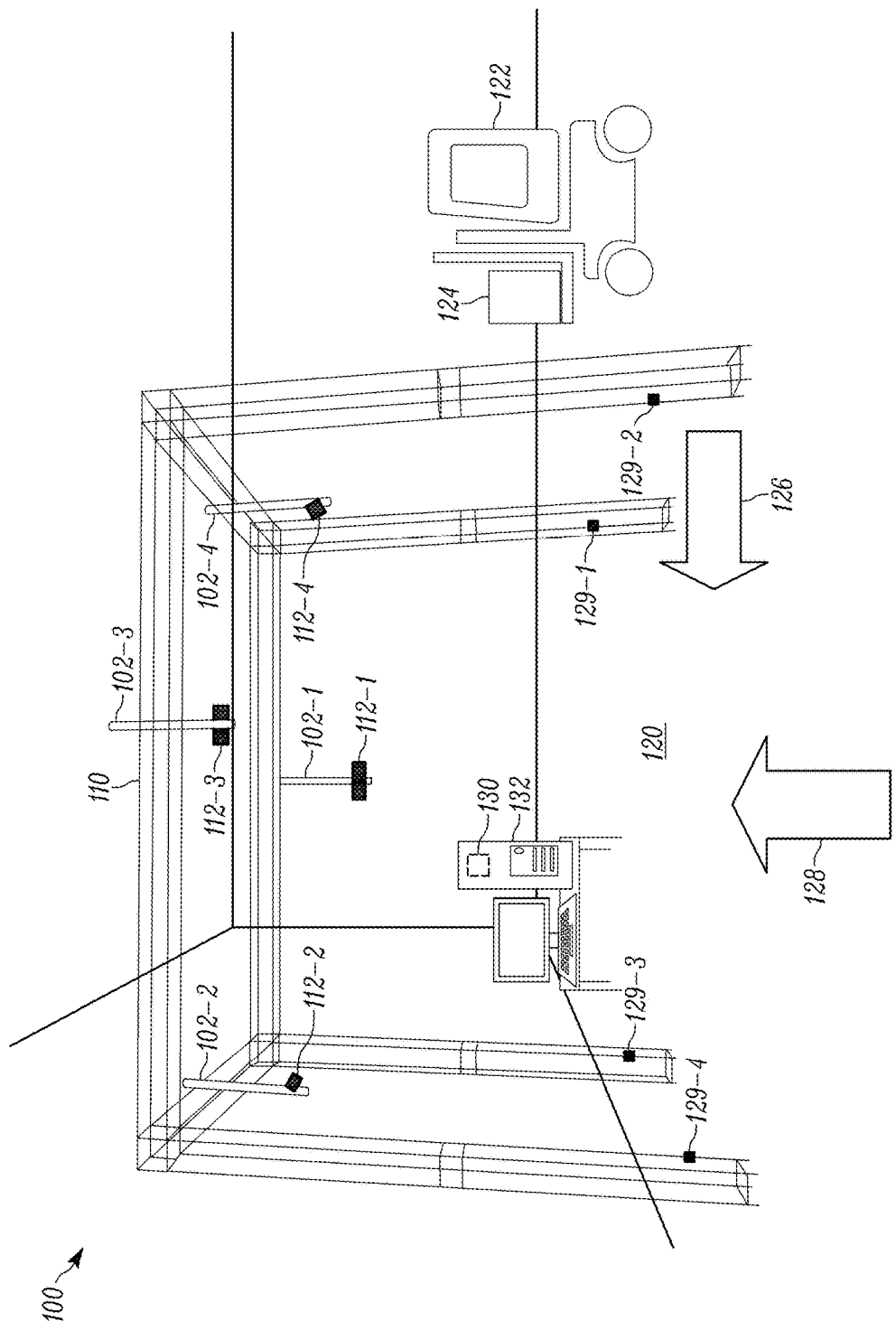
FIG. 1 depicts an example system for segmenting an object.

Advancements in communication technology, such as Internet-based purchasing and ordering, have increased the number of consumers and enterprises that rely on accurate and timely delivery of goods and materials. In turn, demands on those tasked with providing such services have amplified. In addition to greater volumes of packages to be delivered, allotted delivery times have shortened to meet demand as the transportation and logistics industry grows and competition intensifies. Moreover, many entities operate under guarantees in terms of accurate and timely delivery of packages, thereby heightening the importance of accurate and timely performance.

To meet these and other challenges, transportation and logistics entities seek improvements across different aspect of various operations. For example, the process of loading packages into containers (e.g., delivery truck trailers) includes determining which packages should be loaded into which containers, determining a preferred spatial arrangement of the packages in the containers, communicating data to loaders (e.g., persons or machines tasked with physically placing the packages into the containers), and tracking information related to the packages being loaded. Some of these operations involve determining or obtaining one or more characteristics of the packages such as, for example, a weight of a package, a shape of package, and/or one or more dimensions of a package. The process of measuring or obtaining one or more dimensions of an object, such as a package, is sometimes referred to as dimensioning.

However, dimensioning each package to be loaded into a container consumes valuable time. To reduce the time taken to dimension packages, some systems utilizes machines, such as scanners or imagers, to obtain measurements. In known systems that utilize machines to obtain measurements, packages to be imaged or scanned are stationary and isolated from other objects due to challenges and complexities associated with object to be dimensioned being proximate (e.g., abutting or resting on) other objects (e.g., forks of a forklift). Such known systems incur additional time and resource consumption in connection with isolating the packages from other objects before being dimensioned.

In some systems that utilize machines to obtain measurements, an object is not physically separated from, for example, a vehicle carrying the object before the dimensioning process is performed. Rather, first data (e.g., image data) representative of the object is isolated (i.e., distinguished) from second data (e.g., image data) representative of the vehicle. In such instances, the isolation or separation of the first data and the second data is referred to a segmentation. Challenges associated with segmenting are introduced by, for example, use of low-cost three-dimensional sensors, which are may generated noisy data. For instance, multipath interference of a time-of-flight three-dimensional camera may cause inaccurate data (e.g., not representative of an actual scene) in some scenarios. Execution of a segmentation on such data is likely to include errors.

Example methods, systems, and apparatus disclosed herein provide efficient and accurate dimensioning of an object while the object is being carried by a vehicle, such as a forklift. In particular, examples disclosed herein include methods and systems to segment portions of a three-dimensional ("3D") representation of a scene as capture by sensors, such as image sensors, the scene including, for example, a forklift transporting items such as boxes. As described in greater detail below, examples disclosed herein are "prior-aided" systems, methods and devices for detecting and segmenting objects from a 3D representation of scene, and which can include using a 3D point cloud, color based feature matching, and a "high-resolution" image and/ or color image as a prior. In an offline process, a "high-resolution" 3D model, that can include a color texture map of an object, such as a forklift, can first be determined from multi-view scans using a structured light scanner. One of the single views (e.g. a single-view model point cloud) with distinctive texture information such as texts and patterns can be chosen to match the prior image via feature correspondence (which can be referred to as a model-prior match). A "live" process can include acquiring a 3D representation (such as a point cloud and/or a color point cloud) of a scene that includes the object, removing the background such that only the object, and any items on the object are left, selecting a single-view of the scene using its pose and the pose of the single-view model point cloud. The orientation of the prior in the single-view scene can be determined also using feature correspondence (which can be referred to as a prior-scene match). After the model-prior match and the prior-scene match are obtained, a model-scene match can be commutatively derived. The point clouds of the 3D model and the 3D representation of the scene are then used for hypothesis verification and 3D transformation identification. More precise registration such as ICP can also be performed to further refine the model-scene alignment. A bounding box of the 3D model can be estimated and transformed into the 3D representation of the scene using a transformation matrix. Items in the 3D representation of the scene outside the transformed bounding box can then be dimensioned.

Furthermore, the prior-aided systems, methods and devices described herein can lead to better alignment between the 3D model and the 3D representation to perform the segmenting, which can lead to fewer errors in dimensioning items, and hence faster dimensioning. Indeed, without the prior-aided systems, methods and devices described herein segmenting and/or dimensioning of items may need to be repeated until accurate segmenting and/or dimensioning of the items is achieved. Hence, the prior-aided systems, methods and devices described herein can lead to fewer repetitions in segmenting and/or dimensioning of items. Therefore, the prior-aided systems, methods and devices described herein can lead to more efficient operating of computing devices segmenting and/or dimensioning of items and/or improvements to computing devices used for segmenting and/or dimensioning of items.

An aspect of the specification provides a method comprising: receiving, at a controller, from one or more sensors, a three-dimensional (3D) representation of a scene that includes an object represented by a 3D model; determining, at the controller, an orientation of a 2D image in the 3D representation by matching the 2D image with a corresponding region of the 3D representation; determining, at the controller, a first portion of the 3D representation that corresponds to a subset of the 3D model of the object from: the orientation of the 2D image in the 3D representation; and predetermined matching data representative of a matching of the 2D image with a respective corresponding region of the 3D model, each of the 3D model, the 2D image, and the predetermined matching data stored in a memory accessible to the controller; and segmenting, at the controller, the first portion of the 3D representation from a second portion of the 3D representation.

In some example implementations, the segmenting the first portion of the 3D representation from the second portion of the 3D representation includes removing the first portion of the 3D representation that corresponds to the subset of the 3D model. In some example implementations, the method further comprises dimensioning one or more items represented by the second portion of the 3D representation that remains after the first portion of the 3D representation that corresponds to the 3D model is removed.

In some example implementations, the 3D representation of the scene comprises one or more of a point cloud, color data associated with the point cloud, and a color point cloud.

In some example implementations, each of the determining the orientation of the 2D image in the 3D representation, and the determining the first portion of the 3D representation that corresponds to a subset of the 3D model of the object includes: 3D point cloud feature matching and color feature matching.

In some example implementations, the 3D representation of the scene comprises a plurality of images from the one or more sensors, and the matching of the 2D image with a corresponding region of the 3D representation comprises performing a 2D matching between the 2D image and one image of the plurality of images. In some example implementations, the method further comprises determining a direction of travel of the object in the scene, and determining the one image of the plurality of images to use in the 2D matching from the direction of travel.

In some example implementations, the method further comprises optimizing the 3D representation by one or more of: a 3D Hough transformation, geometry consistence clustering, iterative closest point registration refinement and 3D hypothesis verification.

In some example implementations, the segmenting the first portion of the 3D representation from the second portion includes determining a bounding box of the subset of the 3D model in the 3D representation and removing data corresponding to the bounding box from the 3D representation.

In some example implementations, the 2D image comprises a representation of markings on the object, the markings including one or more of a logo, a given portion of the object, a feature-rich image, and a unique portion of the object.

In some example implementations, the 3D model of the object comprises a 3D model of a forklift, and the subset of the 3D model excludes forks of the forklift.

Another aspect of the specification provides a device comprising: a controller, and a communication interface, the controller configured to: receive, using the communication interface, from one or more sensors, a three-dimensional (3D) representation of a scene that includes an object represented by a 3D model; determine an orientation of a 2D image in the 3D representation by matching the 2D image with a corresponding region of the 3D representation; determine a first portion of the 3D representation that corresponds to a subset of the 3D model of the object from: the orientation of the 2D image in the 3D representation; and predetermined matching data representative of a matching of the 2D image with a respective corresponding region of the 3D model, each of the 3D model, the 2D image, and the predetermined matching data stored in a memory accessible to the controller; and segment the first portion of the 3D representation from a second portion of the 3D representation.

In some example implementations, the controller is further configured to segment the first portion of the 3D representation from the second portion of the 3D representation by removing the first portion of the 3D representation that corresponds to the subset of the 3D model. In some example implementations, the controller is further configured to dimension one or more items represented by the second portion of the 3D representation that remains after the first portion of the 3D representation that corresponds to the 3D model is removed.

In some example implementations, the 3D representation of the scene comprises one or more of a point cloud, color data associated with the point cloud, and a color point cloud.

In some example implementations, each of determining the orientation of the 2D image in the 3D representation, and determining the first portion of the 3D representation that corresponds to a subset of the 3D model of the object includes: 3D point cloud feature matching and color feature matching.

In some example implementations, the 3D representation of the scene comprises a plurality of images from the one or more sensors, and the controller is further configured to match of the 2D image with a corresponding region of the 3D representation by performing a 2D matching between the 2D image and one image of the plurality of images. In some example implementations, the controller is further configured to determine a direction of travel of the object in the scene, and determine the one image of the plurality of images to use in the 2D matching from the direction of travel.

In some example implementations, the controller is further configured to optimize the 3D representation by one or more of: a 3D Hough transformation, geometry consistence clustering, iterative closest point registration refinement and 3D hypothesis verification.

In some example implementations, the controller is further configured to segment the first portion of the 3D representation from the second portion by determining a bounding box of the subset of the 3D model in the 3D representation and removing data corresponding to the bounding box from the 3D representation.

In some example implementations, the 2D image comprises a representation of markings on the object, the markings including one or more of a logo, a given portion of the object, a feature-rich image, and a unique portion of the object.

In some example implementations, the 3D model of the object comprises a 3D model of a forklift, and the subset of the 3D model excludes forks of the forklift.

Another aspect of the specification provides a computer-readable medium storing a computer program, wherein execution of the computer program is to cause a machine to perform operations comprising: receiving, at a controller, from one or more sensors, a three-dimensional (3D) representation of a scene that includes an object represented by a 3D model; determining, at the controller, an orientation of a 2D image in the 3D representation by matching the 2D image with a corresponding region of the 3D representation; determining, at the controller, a first portion of the 3D representation that corresponds to a subset of the 3D model of the object from: the orientation of the 2D image in the 3D representation; and predetermined matching data representative of a matching of the 2D image with a respective corresponding region of the 3D model, each of the 3D model, the 2D image, and the predetermined matching data stored in a memory accessible to the controller; and segmenting, at the controller, the first portion of the 3D representation from a second portion of the 3D representation. In some example implementations, computer-readable medium comprises a non-transitory computer-readable medium.

While the foregoing explains challenges associated with package loading and delivery, similar challenges exist in other environments and applications that involve a need for accurate and efficient dimensions of objects. For example, inventory stocking operations and warehouse management operations suffer when objects are not accurately placed in assigned locations. Further, while example methods, systems and apparatus disclosed herein are described below in connection with package loading operations at a loading dock, example methods, systems and apparatus disclosed herein can be implemented in any other suitable context or environment such as, for example, a warehouse, a retail establishment, an airport, a train loading location, or a shipping port. Moreover, while the following describes a forklift and dimensioning packages being carried by a forklift, example methods, systems, and apparatus disclosed herein are applicable to additional or alternative types of objects and/or additional or alternative types of carriers (e.g., containers, persons carrying object(s), and/or different types of vehicles).

FIG. 1 illustrates an example environment in which example methods, systems and apparatus disclosed herein may be implemented. The example of FIG. 1 is representative of a loading dock including a dimensioning system 100 constructed in accordance with teachings of this disclosure. The example dimensioning system 100 of FIG. 1 includes a north imaging station 102-1, a west imaging station 102-2, a south imaging station 102-3 and an east imaging station 102-4. The imaging stations 102-1, 102-2, 102-3, 102-4 will be interchangeably referred to hereafter, collectively, as stations 102 and, generically, as a station 102. The imaging stations 102 of FIG. 1 are mounted to a frame 110. Alternative examples include any suitable number (e.g., three (3) or five (5)) of imaging stations deployed in any suitable manner (e.g., mounted to walls). The terms "north," "west," "south" and "east" are used for ease of reference and not limitation.

Each of the stations 102 of FIG. 1 includes a respective image sensor 112-1, 112-2, 112-3, 112-4, capable of capturing color data and depth data in a respective coordinate system. The image sensors 112-1, 112-2, 112-3, 112-4 will be interchangeably referred to hereafter, collectively, as sensors 112 and, generically, as a sensor 112. For example, in some example implementations, each of the sensors 112 is an RGB-D ("Red-Green-Blue-Depth) sensor (e.g., a Kinect® sensor) that generates an RGB value and a depth value for each pixel in a coordinate system. In alternative examples, each of the stations 102 includes a three-dimensional (3D) image sensor that provides depth data and a separate two-dimensional (2D) image sensor that provides color data. In such instances, the 2D image sensor is registered to the coordinate system of the associated 3D image sensor, or vice versa, such that the color data of each pixel is associated with the depth data of that pixel.

Each of the sensors 112 of FIG. 1 is pointed toward an imaging area 120. Each of the sensors 112 is tilted (e.g., at a forty-five (45) degree angle toward a floor of the imaging area 120. As such, each of the sensors 112 generates color data and depth data representative of the imaging area 120.

Furthermore, while four stations 102 and four sensors 112 are depicted in the system 100 of FIG. 1, other example implementations include more than four stations and/or more than four sensors or fewer than four stations and/or fewer than four sensors. In general, however, the sensors 112 of the system 100 are configured to, collectively, capture a 3D representation of a scene, for example a 3D representation of at least a portion of the imaging area 120. Hence, when a vehicle 122 carrying an item 124 enters the imaging area 120, the sensors 112 generate color data and depth data representative of the vehicle 122 and the item 124 from the respective perspectives to capture a 3D representation of the vehicle 122 and the item 124.

In the example of FIG. 1, the vehicle 122 is a forklift and the item 124 is a package to be dimensioned by the dimensioning system 100. For example, the vehicle 122 may be in the process of moving the item 124 from a warehouse location to a trailer or other type of container associated with the loading dock illustrated in FIG. 1. In the illustrated example, vehicles can enter the imaging area 120 in a first direction 126 or a second direction 128. However, any suitable number of directions are possible depending on, for example, surrounding environmental arrangement of the loading dock. As illustrated in FIG. 1, the vehicle 122 is entering the imaging area 120 in the first direction 126, which is towards the west imaging station 114.

In depicted example implementations, the system 100 further includes sensors 129-1, 129-2, 129-3, 129-4 located on the frame 110 in positions to assist with detection of a direction of movement of the vehicle 122. The sensors 129-1, 129-2, 129-3, 129-4 will be interchangeably referred to hereafter, collectively, as sensors 129 and, generically, as a sensor 129. For example, in some examples, each of the sensors 129 comprises a motion detector, and the like positioned at a height on the frame 110 where a direction of motion of the vehicle 122 is detectable. While four sensors 129 are depicted in the system 100 of FIG. 1, other example implementations include more than four sensors for assisting with detection of a direction of movement or fewer than four sensors for detection of a direction of movement. In some examples, the system 100 is configured to detect the direction of motion of the vehicle 122 using one or more of the sensors 112 (for example using image processing techniques), and the system 100 is absent any further sensors for assisting with detection of a direction of movement (e.g. sensors 129 are absent from the system 100).

To efficiently and accurately dimension the item 124 being carried by the vehicle 122 without interrupting movement of the vehicle 122 and without requiring physical removal of the item 124 from the vehicle 122, the example dimensioning system 100 of FIG. 1 includes a freight dimensioner 130 constructed in accordance with teachings of this disclosure. In the illustrated example of FIG. 1, the freight dimensioner 130 is implemented on a processing platform 132 deployed at the loading dock. As depicted, the platform 132 comprises a personal computer, or the like, located at the loading dock, and is in communication with a display device and keyboard, which can be components of the personal computer and/or integrated with the personal computer.

However, the example freight dimensioner 130 disclosed herein may be implemented in any suitable processing platform such as, for example, a processing platform deployed at a remote location (e.g., a remote server), at one or more on the vehicle 122 and/or a mobile processing platform carried by a person associated with the vehicle 122 or, more generally, the loading dock.

Figure 2:
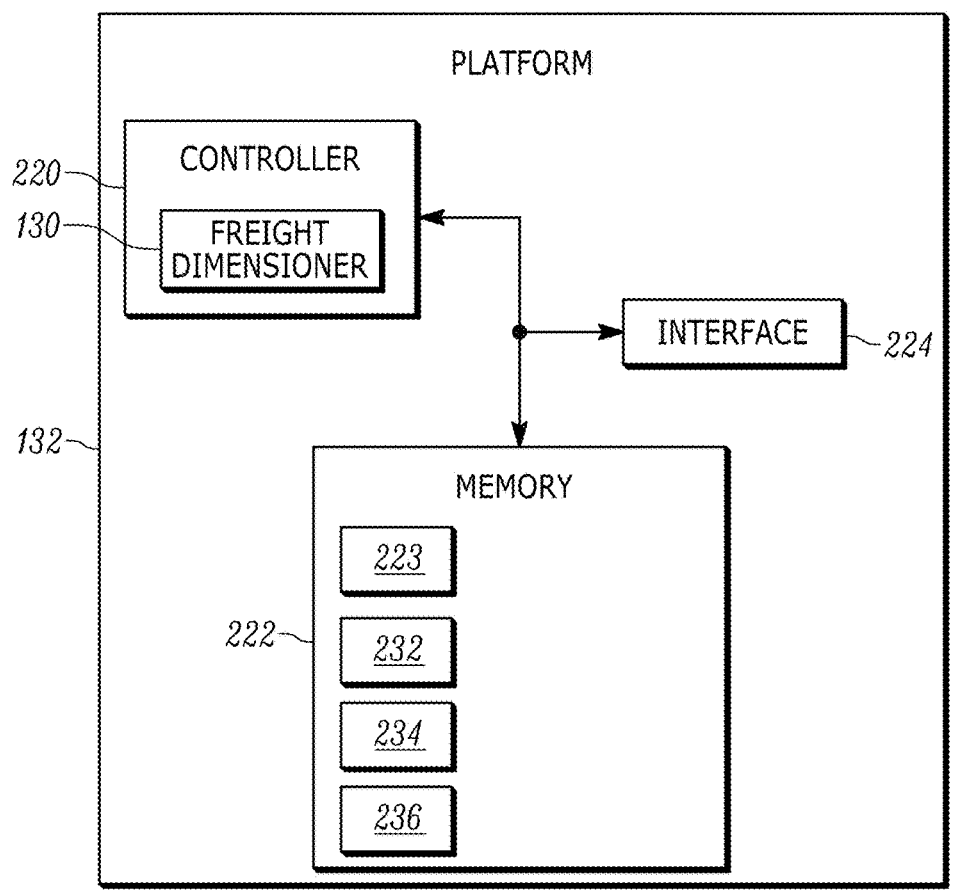
FIG. 2 depicts an example platform for segmenting an object.

Attention is next directed to FIG. 2, which depicts a schematic diagram of an example implementation of the platform 132. In the example of FIG. 2, the platform 132 includes a controller 220 in communication with a memory 222 storing an application 223, and a communication interface 224 (interchangeably referred to hereafter as interface 224). In the depicted example implementation, the freight dimensioner 130 is a component of the controller 220, though, in alternative example implementations, the freight dimensioner 130 is a separate component of the platform 132, or, in yet further implementations, the controller 220 is a component of the freight dimensioner 130. Hence, while hereafter the functionality of the platform 132 is described as being implemented by the controller 220, the functionality of the platform 132 is interchangeably performed by the freight dimensioner 130.

In some examples, the platform 132 includes any suitable additional or alternative components such as, for example, a warehouse inventory tracking application and/or other data acquisition applications and the like. In general, the platform 132 is in communication with the sensors 112 and, when present, the sensors 129, using, for example, interface 224.

As depicted, the memory 222 further stores: a 3D model 232 of an object; a 2D image 234; and predetermined matching data 236 representative of a matching of the 2D image 234 with a respective corresponding region of the 3D model 232, as described in further detail below.

The example controller 220 of FIG. 2 includes one or more logic circuits configured to, for example, implement freight dimensioning functionality of the platform 132. Example logic circuits include one or more processors, one or more microprocessors, one or more ASIC (application-specific integrated circuits) and one or more FPGA (field-programmable gate arrays). In the example of FIG. 2, the controller 220 is configured to segment portions of a 3D representation of a scene, for example, a 3D representation of the imaging area 120. In some examples, the platform 132 is not a generic computing device, platform configured to implement specific freight dimensioning functionality. For example, the platform 132 and/or the controller 220 may specifically comprise a computer executable engine configured to specific freight dimensioning functionality.

The memory 222 of FIG. 2 is a machine readable medium that stores machine readable instructions to implement one or more programs or applications. Example machine readable media include a non-volatile storage unit (e.g. Erasable Electronic Programmable Read Only Memory ("EE-PROM"), Flash Memory) and/or a volatile storage unit (e.g. random access memory ("RAM")). In the example of FIG. 2, programming instructions (e.g., machine readable instructions) that implement the functional teachings of the platform 132 as described herein are maintained, persistently, in the memory 222 and used by the controller 220 which makes appropriate utilization of volatile storage during the execution of such programming instructions. In some example implementations, the memory 222 is external to the platform 132. Regardless, the memory 222 is accessible to the controller 220 via a computer bus of platform 132 and/or the interface 224.

The example memory 222 of FIG. 2 stores instructions corresponding to the application 223 that, when executed by the controller 220, enables the controller 220 to implement freight dimensioning functionality associated with the application 223. In the illustrated example, when the controller 220 executes the application 223, the controller 220 is configured to: receive from one or more of the sensors 112, a three-dimensional (3D) representation of a scene that includes an object represented by the 3D model 232; determine an orientation of the 2D image 234 in the 3D representation by matching the 2D image 234 with a corresponding region of the 3D representation; determine a first portion of the 3D representation that corresponds to a subset of the 3D model 232 of the object from: the orientation of the 2D image 234 in the 3D representation; and the predetermined matching data 236 representative of a matching of the 2D image 234 with a respective corresponding region of the 3D model 232, each of the 3D model 232, the 2D image 234, and the predetermined matching data 236 stored in the memory 222 accessible to the controller 220; and segment the first portion of the 3D representation from a second portion of the 3D representation. In some example implementations, the segmenting, by the controller 220, of the first portion of the 3D representation from the second portion of the 3D representation comprises removing the first portion of the 3D representation that corresponds to the subset of the 3D model 232; and the controller 220 is further configured to dimension one or more items represented by the second portion of the 3D representation that remains after the first portion of the 3D representation that corresponds to the 3D model 232 is removed.

The example interface 224 of FIG. 2, which is implemented by, for example, one or more radios and/or connectors and/or network adaptors, is configured to communicate wired and/or wirelessly with network architecture that is used to implement one or more communication links between other devices and/or a network. Example communication links include any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, WLAN (wireless local area network) links, WiFi links, WiMax links, packet based links, the Internet, analog networks, the PSTN (public switched telephone network), access points, and the like, and/or a combination.

In particular, the example interface 224 is configured to communicate in a wired and/or or wireless manner with sensors 112 (and, when present, the sensors 129).

While not explicitly depicted in FIG. 2, the example platform 132 and/or the example controller 220 can further be in communication with a display device and one or more input devices, such as a keyboard, and is further provided with power by one or more of a connection to a mains power supply, a battery, a power pack, and the like.

The example platform 132 may include additional or alternative components related to, for example, warehousing, inventory, messaging, entertainment, and/or any other components that may be used with either a fixed position platform or a mobile position platform.

Figure 3:
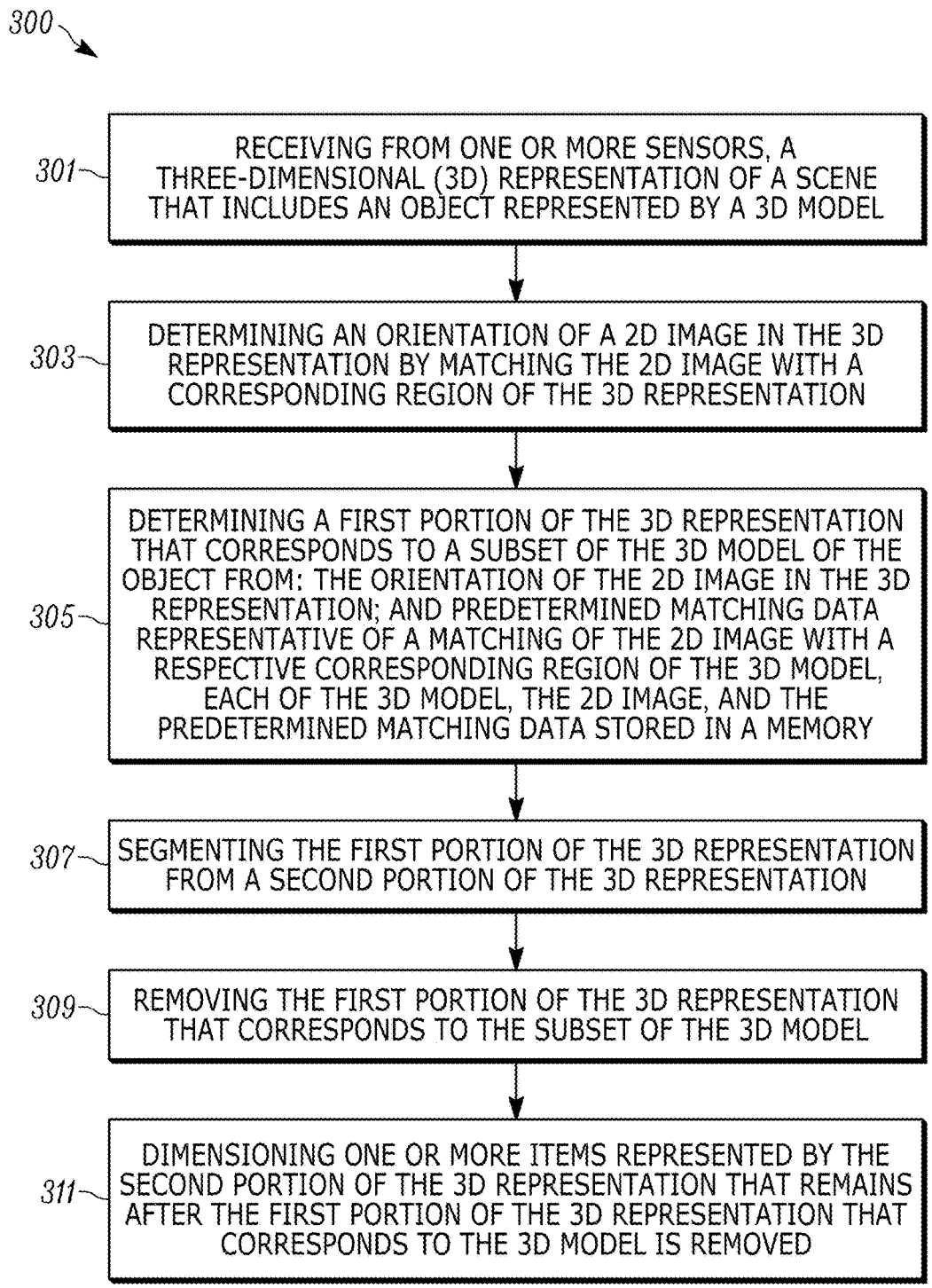
FIG. 3 is a flowchart representative of an example method for segmenting an object.

Attention is now directed to FIG. 3 which depicts a flowchart representative of an example method 300 for segmenting objects. The example operations of the example method 300 of FIG. 3 correspond to machine readable instructions that are executed by, for example, the platform 132 of FIG. 2, and specifically by the controller 220 of the platform 132 and/or by the freight dimensioner 130. In the illustrated example, the instructions represented by the blocks of FIG. 3 are stored at the memory 222, for example, as the application 223. The example method 300 of FIG. 3 is one way in which the platform 132 may be configured. Furthermore, the following discussion of the example method 300 of FIG. 3 will lead to a further understanding of the platform 132, and its various components. However, it is to be understood that the platform 132 and/or the example method 300 may be varied, and need not work exactly as discussed herein in conjunction with each other, and that such variations are within the scope of present implementations.

The example method 300 of FIG. 3 need not be performed in the exact sequence as shown and likewise various blocks may be performed in parallel rather than in sequence. Accordingly, the elements of the example method 300 are referred to herein as "blocks" rather than "steps." The example method 300 of FIG. 3 may alternatively be implemented on variations of the example platform 132, the example controller 220 and/or the example freight dimensioner 130 of FIG. 2, as well.

It is further assumed, in the following description of the example method 300, that the memory 222 is provisioned with the 3D model 232, the 2D image 234, and the predetermined matching data 236. Provisioning of the memory 222 with the 3D model 232, the 2D image 234, and the predetermined matching data 236 is described in further detail below.

At block 301, the controller 220 receives from one or more of the sensors 112, a 3D representation of a scene (i.e., a 3D scene representation) that includes an object (e.g., a forklift) represented by the 3D model 232.

At block 303, the controller 220 determines an orientation of the 2D image 234 (e.g., an image of a logo) in the 3D scene representation by matching the 2D image 234 with a corresponding region of the 3D scene representation.

At block 305, the controller 220 determines a first portion of the 3D scene representation that corresponds to a subset of the 3D model 232 of the object from: the orientation of the 2D image 234 in the 3D scene representation; and the predetermined matching data 236 representative of a matching of the 2D image 234 with a respective corresponding region of the 3D model 232, each of the 3D model 232, the 2D image 234, and the predetermined matching data 236 stored in the memory 222 accessible to the controller 220.

At block 307, the controller 220 segments the first portion of the 3D scene representation from a second portion of the 3D scene representation.

At block 309, the controller 220 removes the first portion of the 3D scene representation that corresponds to the subset of the 3D model 232.

At block 311, the controller 220 is further configured to dimension one or more items represented by the second portion of the 3D scene representation that remains after the first portion of the 3D scene representation that corresponds to the 3D model 232 is removed.

In some example implementations, the block 309 can be performed in parallel with and/or in conjunction with block 307 such that segmenting the first portion of the 3D scene representation from the second portion of the 3D representation at the block 307 comprises the controller 220 removing the first portion of the 3D scene representation that corresponds to the subset of the 3D model 232.

In some implementations, the example method 300 ends at the platform 132 at the block 307, and the platform 132 provides intermediate segmentation data to another device and/or platform which performs the remainder of the example method 300.

The example method 300 will now be described with reference to FIG. 4 to FIG. 11.

Figure 4:
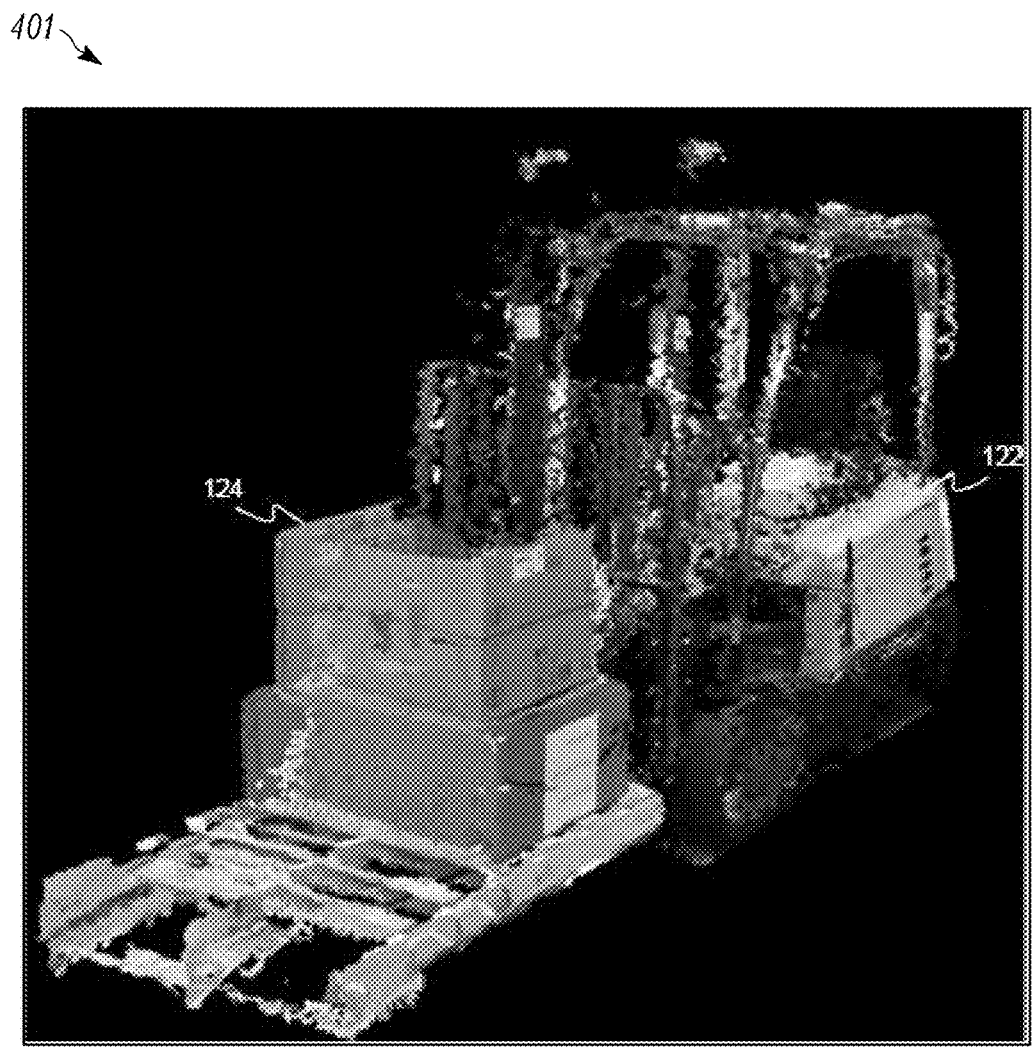
FIG. 4 depicts an example three-dimensional representation of a scene that includes an object to be segmented.

Attention is next directed to FIG. 4 which depicts an example 3D representation 401 of a scene captured by the sensors 112. Hence, FIG. 4 depicts an example of the block 301 of the example method 300.

In particular, the 3D scene representation 401 includes data capture by the sensors 112 that represents the vehicle 122 carrying the item 124 in the imaging area 120. As depicted, the vehicle 122 is a forklift and the item 124 is a plurality of boxes on the forks of the forklift. While the 3D scene representation 401 is depicted at a given pose (e.g. a given position, an angle, a given orientation, and the like), the 3D scene representation 401 includes data that represents any surface of the vehicle 122 carrying the item 124 which is within a field-of-view of any of the sensors 112. While not depicted in FIG. 4, the 3D scene representation 401 includes a region which corresponds to the 2D image 234, as described in more detail below. In particular, a region of the 3D scene representation 401 which corresponds to the 2D image 234 is located on a rear side of the forklift (e.g. a side opposite the item 124).

Furthermore, as will be described in more detail below, the 3D scene representation 401 is generated from a plurality of images (including, but not limited to, high resolution RGB (red-green-blue) images) from the sensors 112 and includes one or more of a point cloud and a color point cloud. In other words, the 3D scene representation 401 includes a plurality of three-dimensional points.

In some example implementations, each point in the point cloud is has color value(s) (e.g. a color point cloud). Hence, in these example implementations, the 3D scene representation 401 includes depth information and color information, including, but not limited to, a color texture map of the represented scene.

In some example implementations, the 3D scene representation 401 received at the block 301 is further subject to background removal process to remove, for example, background images that do not form part of the object being represented by the 3D scene representation 401.

Figure 5:
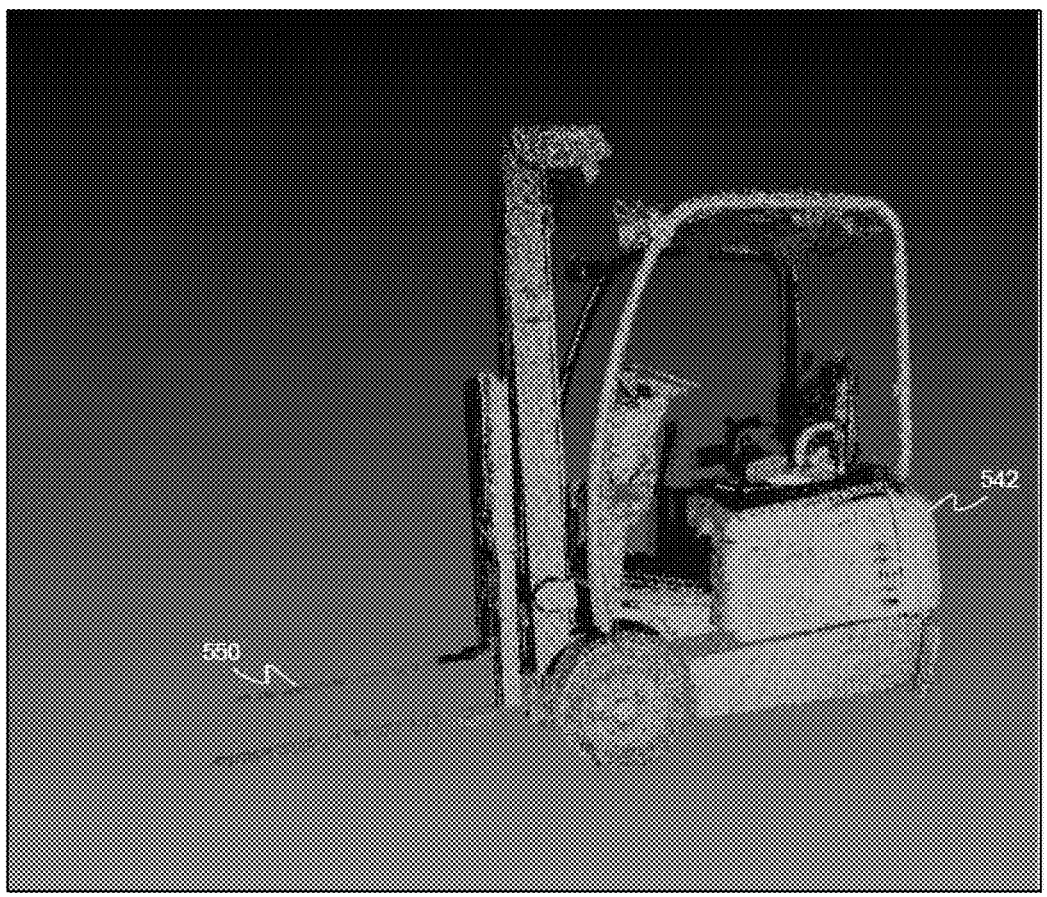
FIG. 5 depicts an example three-dimensional model of a vehicle used in segmenting an object.

Attention is next directed to FIG. 5 which depicts an example visual representation of the 3D model 232 of an object in the 3D scene representation 401. In the example of FIG. 5 the 3D model 232 is a 3D model of the forklift in the 3D scene representation 401 that is generated under tightly controlled conditions prior to the capture of the 3D scene representation.

As with the 3D scene representation 401, in some example implementations, the 3D model 232 includes depth information and color information. Hence, in these example implementations, the 3D model 232 includes depth information and color information, including, but not limited to, a color texture map of the represented object.

The 3D model 232 includes a first subset 542 that corresponds to a body of the forklift and a second subset 550 that corresponds to forks of the forklift. In some example implementations, the 3D model 232 is generated using the sensors (e.g., the sensors 112 of FIG. 1 or other sensors) in a manner similar to obtaining the 3D scene representation 401 (e.g. the forklift is imaged without carrying any items) from images (including, but not limited to, high resolution RGB images) generated by the sensors. Notably, the 3D model 232 is generated based on data captured under tightly controlled conditions (e.g., the forklift is stationary and under preferable lighting conditions) using high definition equipment. Such implementations are described below with respect to FIG. 12 and FIG. 13.

In other example implementations, the 3D' model 232 is generated from a CAD (computer aided design) drawing and/or model of the forklift as provided by a manufacturer and/or as generated using a CAD application. Regardless of how the 3D model 232 is generated, it is assumed in the present specification that the vehicle 122 in the 3D scene representation 401 is represented by the 3D model 232. Furthermore, in some example implementations, the subsets 542, 550 of the 3D model 232 are parsed and/or designated as the subsets 542, 550 by the manufacturer and/or using a CAD application.

In some example implementations, the 3D model 232 excludes the second subset 550 and the 3D model 232 hence defines the body of the forklift.

In some example implementations, the 3D model 232 includes one or more of a point cloud, color data associated with the point cloud, and a color point cloud including, but not limited to, a color texture map.

While not depicted in FIG. 5, the 3D model 232 includes a region which corresponds to the 2D image 234, as described in more detail below. In particular, a region of the 3D model 232 which corresponds to the 2D image 234 is located on a rear side of the forklift (e.g. a side opposite the forks) as depicted at least in FIG. 8 and FIG. 9, described below.

Figure 6:
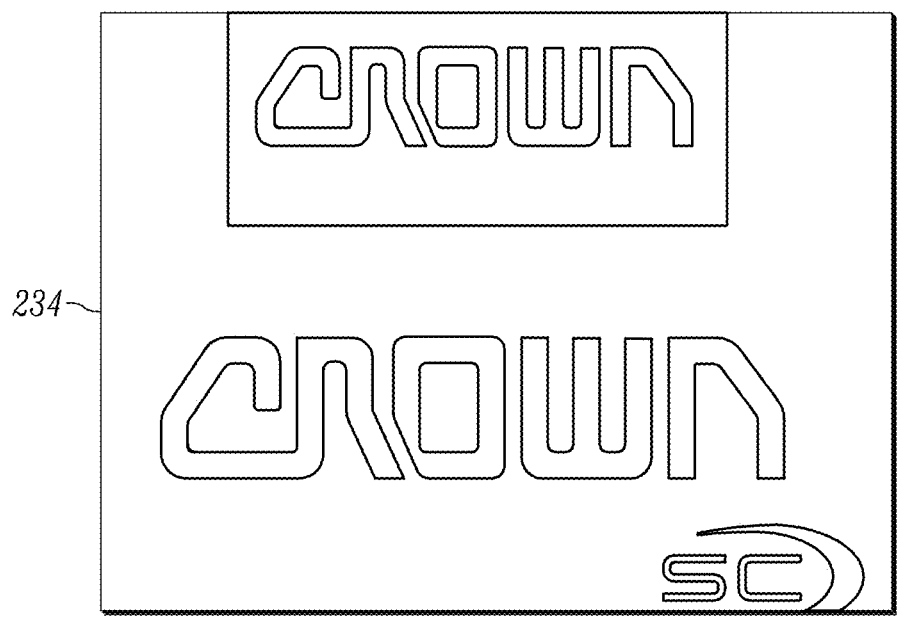
FIG. 6 depicts an example two-dimensional image used as a prior in segmenting an object.

Attention is next directed to FIG. 6 which depicts an example visual representation of the 2D image 234 that corresponds to a region in both the 3D model 232 and the 3D scene representation 401. In particular, the 2D image 234 corresponds to a region of the 3D model 232 and, as the 3D scene representation includes the object represented by the 3D model 232, the 3D scene representation 401 that is unique within both the 3D model 232 and the 3D scene representation 401. Hence, for example, a region of the 3D model 232 which is readily identifiable by the controller 220 and/or freight dimensioner 130 in the 3D representation 401 is selected as the 2D image 234.

In the example of FIG. 6, the 2D image 234 is representative of a logo present at the forklift of both the 3D model 232 and the 3D scene representation 401. In particular, the example 2D image 234 of FIG. 6 is a color 2D image of the logo. However, the 2D image 234 can correspond to other region(s) of the 3D model 232 that do not correspond to a logo, as long as the region is feature-rich and unique in the 3D model 232. In other words, the 2D image 234 corresponds to a region in the 3D model 232 which is not confusable (e.g. by the controller 220 and/or the freight dimensioner 130) and/or unique when compared with other regions of the 3D model 232. Furthermore, the 2D image 234 is selected to be a region of the vehicle 122 that is visible to the sensors 112 when the vehicle 122 (e.g. the forklift) is carrying the item 124. Hence, the 2D image 234 is a representation of marking(s) on an object in the 3D model 232. In some implementations, the term "feature-rich" refers to a plurality of features that are located on the object that render the associated region of the object distinguishable and/or unique from other regions of the object.

In some example implementations, the 2D image 234 is generated from a CAD drawing, while in other example implementations the 2D image 234 is generated using a sensor (e.g. the sensors 112 of FIG. 1) and/or a digital camera and/or the like, for example by using a sensor and/or the digital camera to acquire an image of a portion of the vehicle 122 on which the logo is located.

In some example implementations, the 2D image 234 is alternatively referred to as a "prior" and/or an "image prior".

Furthermore, in some example implementations, the 2D image 234 comprises a color image and/or a 2D color texture map.

Figure 7:
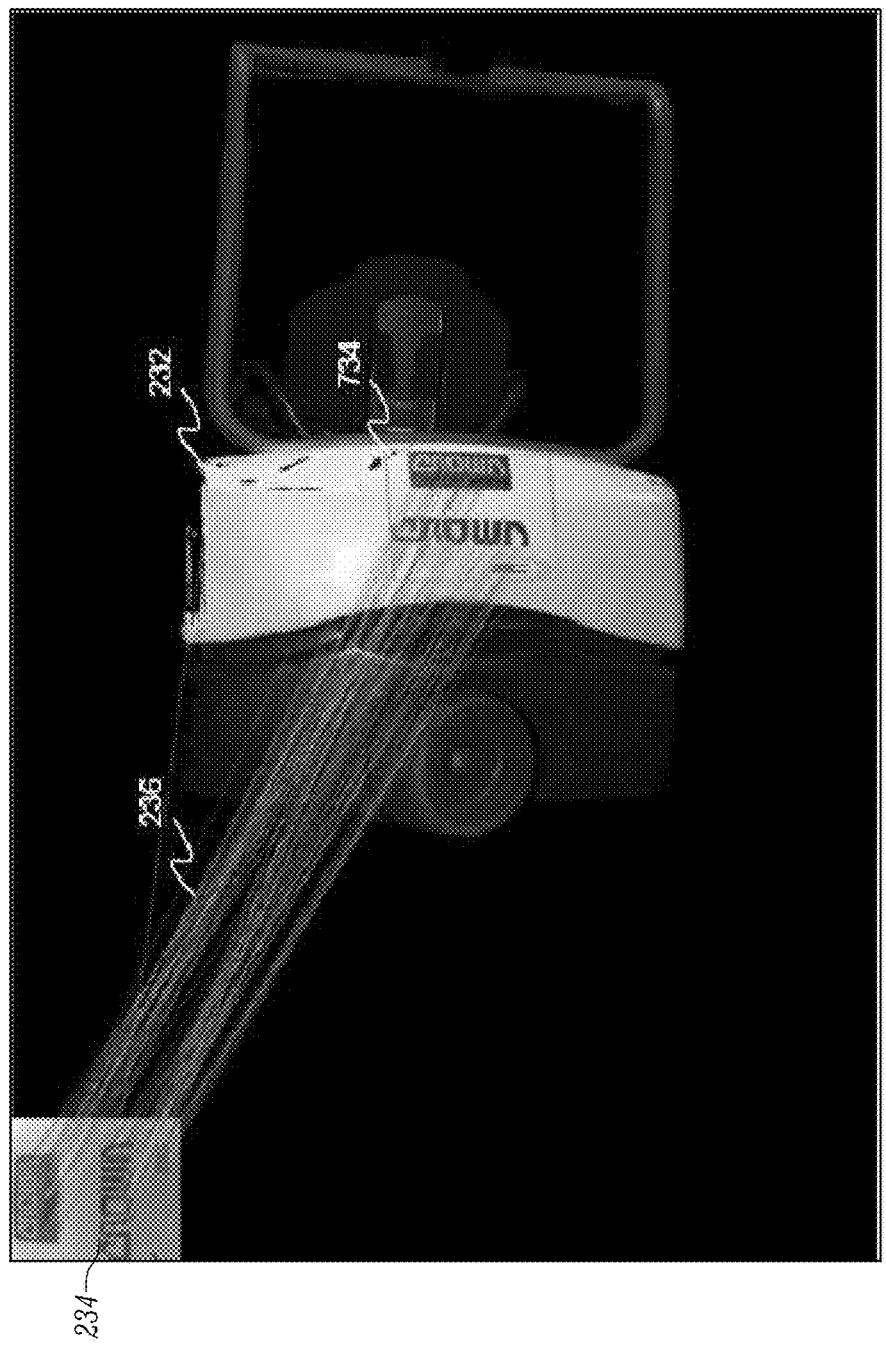
FIG. 7 depicts example feature matching between an example two-dimensional image and an example three-dimensional model.

Attention is next directed to FIG. 7 which is a visual representation of a determination of the matching data 236 of FIG. 2. In the example of FIG. 7, the 2D image 234 and the 3D model 232 are depicted. In particular, the 3D model 232 is depicted at a pose in which a region 734 is visible (e.g. a rear of a forklift) that includes data corresponding to the 2D image 234. Furthermore, in some example implementations, the 3D model 232 depicted in FIG. 7 excludes the forks of the forklift. Using image processing techniques, the controller 220 compares the 2D image 234 with the 3D model 232 and determines correspondences and/or matching between the 2D image 234 and the 3D model 232. Such correspondences and/or matching are visually depicted in FIG. 7 by lines between features in the 2D image 234 and corresponding features in the region 734. Indeed, such correspondences and/or matching are stored as the predetermined matching data 236 which is representative of a matching of the 2D image 234 with the respective corresponding region 734 of the 3D model 232.

In some example implementations, the determination of the correspondences and/or matching between the 2D image 234 and the 3D model 232 occurs using texture guided 3D image matching, for example by matching portions of the 2D image 234 to corresponding portions of the 3D model 232 using color, shapes of letters, and/or shapes of logos.

The determination of the correspondences and/or matching is interchangeably referred to herein as feature matching, which, in some example implementations, occurs using the respective color texture maps of each of the 2D image 234 and the 3D model 232.

In the example of FIG. 7, the forklift represented by the 3D model 232 is depicted on its side; however, any pose of the 3D model 232 in FIG. 7 is possible.

Each of the 3D model 232, the 2D image 234 and the predetermined matching data 236 are stored at the memory 222 before acquiring the 3D scene representation 401. That is, the 3D model 232, the 2D image 234 and the predetermined matched data 236 are generated at a time previous to the capture of the 3D scene representation 401.

Figure 8:
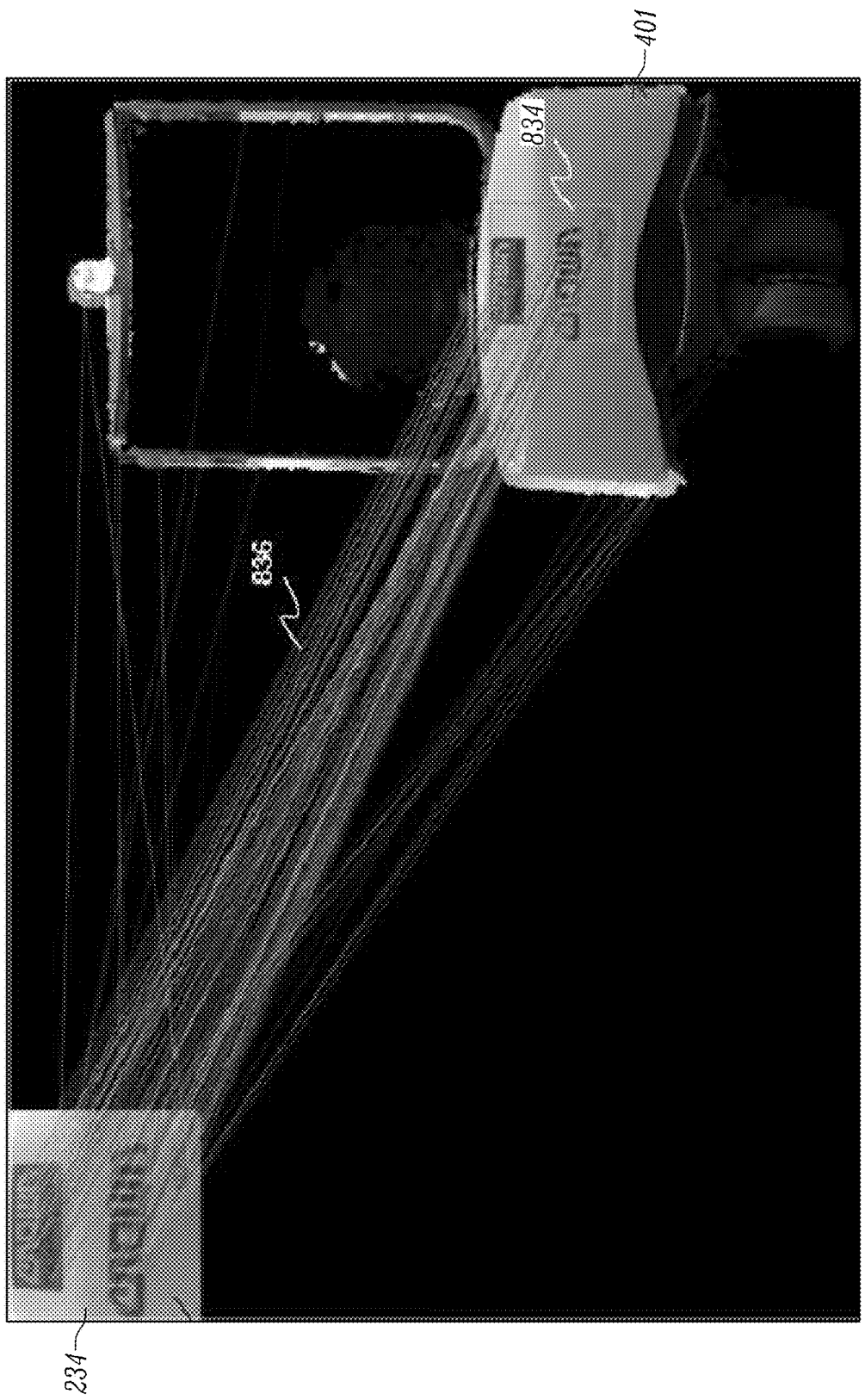
FIG. 8 depicts example feature matching between an example two-dimensional image and an example three-dimensional representation of a scene that includes an object to be segmented.

Attention is next directed to FIG. 8 which depicts a visual representation of the block 303 of the example method 300. In the example of FIG. 8, the 2D image 234 and the 3D scene representation 401 are depicted. In particular, the 3D scene representation 401 is depicted at a pose in which a region 834 is visible (e.g. a rear of a forklift) that includes data corresponding to the 2D image 234. The controller 220 performs feature matching to compare the 2D image 234 with the 3D scene representation 401 and determines correspondences and/or matching between the 2D image 234 and the 3D scene representation 401. Such correspondences and/or matching are visually depicted in FIG. 8 by lines between features in the 2D image 234 and corresponding features in the region 834. In particular, the lines between features in the 2D image 234 and corresponding features in the region 834 represent of an orientation of the 2D image 234 in the 3D scene representation 401 determined by matching the 2D image 234 with a corresponding region (e.g. the region 834) of the 3D scene representation 401.

In some example implementations, the determination of the correspondences and/or matching between the 2D image 234 and the 3D scene representation 401 occurs using texture guided 3D image matching, for example by matching portions of the 2D image 234 to corresponding portions of the 3D scene representation 401 using color, shapes of letters, and/or shapes of logos. In particular, in some example implementations, determining the orientation 836 of the 2D image 234 in the 3D scene representation 401 includes 3D point cloud feature matching, color feature matching and/or color texture map feature matching, for example between the 2D image 234 and the point cloud of the 3D scene representation 401.

Furthermore, while FIG. 8 depicts some correspondences (e.g. lines) between the 2D image 234 and regions of the 3D scene representation 401 outside the region 834, such correspondences are ignored and/or filtered using filtering (e.g., proximity comparisons involving one or more distance thresholds) to remove outliers.

As described above, in some example implementations, the 3D scene representation 401 includes data from a plurality of images generated by the sensors 112. Hence, in some of these implementations, the matching of the 2D image 234 with a corresponding region of the 3D scene representation 401 includes performing a 2D matching between the 2D image 234 and one image of the plurality of images received from the sensors 112. Such a 2D matching can be faster and use fewer processing resources than comparing the 2D image 234 with the entirety of the 3D scene representation 401. Such 2D matching is described in detail with respect to FIG. 15.

Selection of an image from the sensors 112 to compare with the 2D image 234 includes, for example, determining a direction of travel of the object in the scene (e.g. the vehicle 122 and/or the forklift, for example using data from sensors 129), and determining the one image of the plurality of images to use in the 2D matching based on the direction of travel. In some of these implementations, the controller 220 and/or the freight dimensioner 130 is preconfigured with an expected location of the region 834, such as a rear of a forklift, such that when a direction of travel of the vehicle 122 is determined, an image from the sensors 112 is selected for comparison with the 2D image 234 that is likely to include the region 834. For example, with reference to FIG. 1, when a direction of travel is determined to be the first direction 126, an image from the sensors 112 is selected that is likely to include a rear of the vehicle 122 (e.g. an image from the sensor 112-4 acquired when the vehicle 122 is within the imaging area 120). In these examples, the expected location of the region 834 is generally provided to the controller 220 and/or the freight dimensioner 130, for example in geometry data and/or coordinate data associated with the 3D model 232 and/or of an object and/or vehicle to be imaged.

Figure 9:
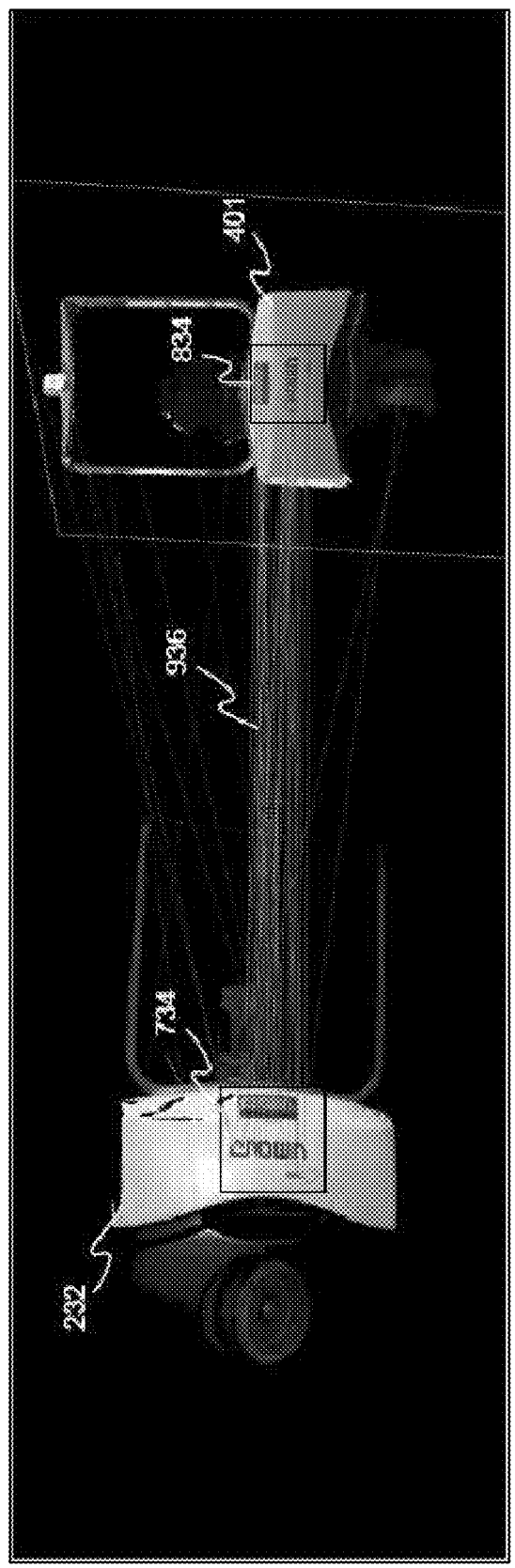
FIG. 9 depicts example commutative feature matching an example three-dimensional model and an example three-dimensional representation of a scene that includes an object to be segmented.

Attention is next directed to FIG. 9 which depicts a visual representation of the block 305 of the example method 300. In the example of FIG. 9, the 3D model 232 and the 3D scene representation 401 are depicted, as well as the regions 734, 834 that correspond to the 2D image 234. As the orientation 836 of the 2D image 234 in the 3D scene representation 401 is determined (e.g. for the region 834), and as the predetermined matching data 236 is representative of a matching of the 2D image 234 with a respective corresponding region 734 of the 3D model 232, the controller 220 (and/or the freight dimensioner 130) commutatively determines a first portion of the 3D scene representation 401 that corresponds to a subset of the 3D model 232 of the object, and specifically makes such a determination from: the orientation 836 of the 2D image 234 in the 3D scene representation 401 and the predetermined matching data 236.

As in the determination of the orientation 836 of the 2D image 234 in the 3D scene representation 401, in some example implementations, determining the portion of the 3D scene representation 401 that corresponds to a subset of the 3D model 232 of the object (e.g. in the 3D representation 401) includes but is not limited to: 3D point cloud feature matching, color feature matching and/or color texture map feature matching.

In other words, at the block 305, the controller 220 determines a position and/or orientation of the region 834 in the 3D representation 401 and aligns the corresponding region 734 of the 3D model 232 with the region 834, which in turn orients the 3D model 232 with respect to the 3D scene representation 401. As such, a first portion of the 3D scene representation 401 is aligned with at least a subset of the 3D model 232. In particular, lines between the region 734 and the region 834 in the example of FIG. 9 represent a determined correspondence 936 between the features in each of the regions 734, 834.

This correspondence is used to transform (e.g., using a transformation matrix) the 3D model 232 into the 3D scene representation 401. The 3D model 232 is a cleaner (e.g., less noisy) representation of the vehicle 122 than the data of the 3D scene representation captured by the sensors 112 in real time. Thus, transforming the 3D model 232 into the 3D scene representation 401 in proper alignment with the corresponding data of the 3D scene representation 401 enables image processing operations (e.g., generating a bounding box around the vehicle 122) to be performed on clean, high definition data. Put another way, using the correspondence information provided by the identification of the 2D image 234 in the 3D model 232 and the 3D scene representation 401, the 3D model 234 is imported into the scene so that the high definition data of the 3D model 232 can be used to represent the vehicle 122, rather than the noisy information generated by the sensors 112 in real time under non-ideal conditions. In some examples, transforming the 3D model 232 into the 3D scene representation 401 includes one or more of a 3D Hough transformation, geometry consistence clustering, iterative closest point registration refinement and a 3D hypothesis verification. While present examples include the specific optimization techniques of 3D Hough transformation, geometry consistence clustering, iterative closest point registration refinement and 3D hypothesis verification, any optimization technique that may increase the accuracy of the alignment and/or orientation of the 3D model 232 in the 3D scene representation.

In some implementations, when the 3D model 232 comprises a 3D model of a forklift, the subset of the 3D model 232 that excludes the forks of the forklift is used in the alignment. Alternatively, the 3D model 232 used in the example of FIG. 9 excludes the forks of the forklift. Hence, with reference to FIG. 5, in some example implementations, the first subset 542 is used in the alignment, but not the second subset 550. With reference to FIG. 4, the forks of the forklift (e.g. the vehicle 122) in the 3D scene representation 401 are generally not visible due to the presence of the item 124).

Figure 10:
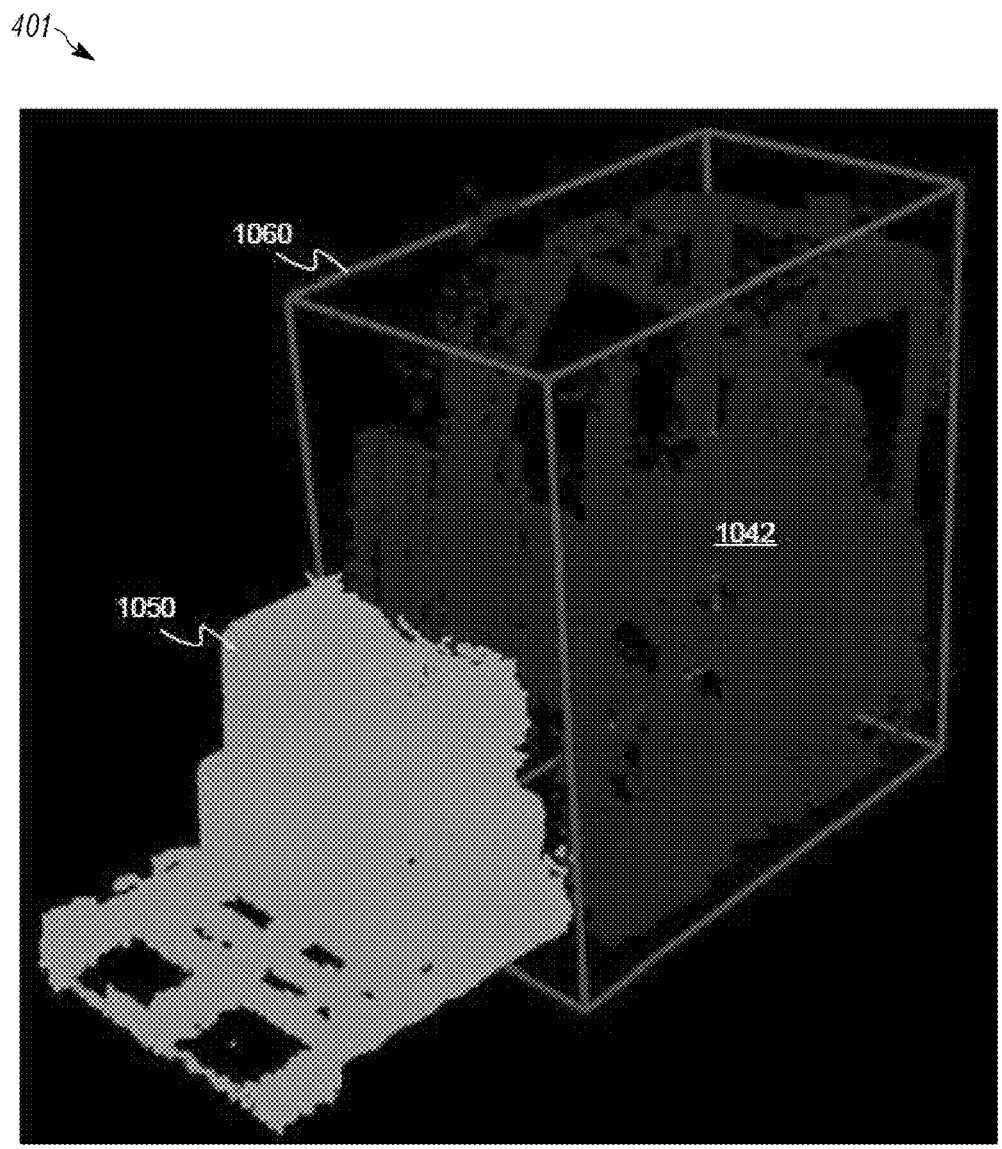
FIG. 10 depicts example segmenting of an object using an example bounding box.

Attention is next directed to FIG. 10 which depicts an example implementation of the block 307 of the example method 300. In FIG. 10, a first portion 1042 of the 3D scene representation 401 is segmented from a second portion 1050 of the 3D scene representation 401. The first portion 1042 corresponds to the first subset 542 of the 3D model 232, positioned in (e.g., transformed into) the 3D scene representation 401 at the block 305 of the example method 300, and the second portion 1050 is the remaining portion of the 3D scene representation 401, which includes the item 124 to be dimensioned.

Also depicted in FIG. 10 is a bounding box 1060 which contains the first portion 1042. The bounding box 1060 is determined using dimensions of the vehicle 122 (e.g. the forklift) according to the 3D model 232, which, in these implementations are provisioned and/or received at the controller 220 prior to determining the bounding box 1060. In such implementations, to reduce computation time and use of resources at the controller 220, the segmenting of the first portion 1042 of the 3D scene representation 401 from the second portion 1050 includes determining the bounding box 1060 using the first subset 542 of the 3D model 232, as positioned in the 3D scene representation 401, and removing data corresponding to (e.g., located within) the bounding box 1060 from the 3D scene representation 401. In other words, the bounding box 1060 is positioned at the 3D scene representation 401 and points therein are removed, thereby leaving the second portion 1050.

While each of the first portion 1042 and the second portion 1050 is depicted in FIG. 10 in outline, it is understood that at least the second portion 1050 comprises a same format as the 3D scene representation 401 and, in particular, one or more of a point cloud color data associated with the point cloud, and a color point cloud.

Figure 11:
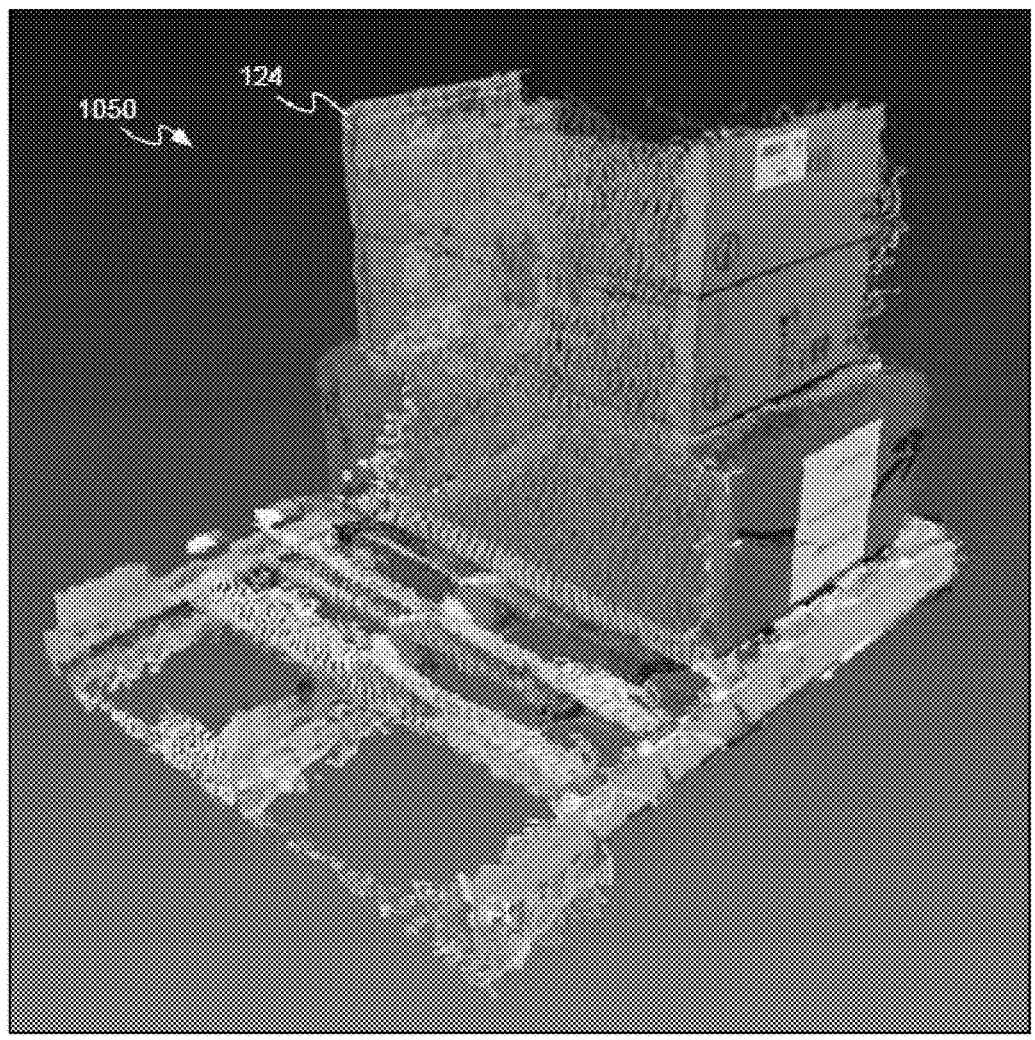
FIG. 11 depicts an example portion of a segmented object that includes items to be dimensioned.

Attention is next directed to FIG. 11 which depicts a visual representation of the block 309 of the example method 300 in which the first portion 1042 has been removed from the 3D scene representation 401. In particular, FIG. 11 depicts the second portion 1050, which includes a representation of the item 124. As depicted, the item 124 represented by the second portion 1050 includes three boxes, which are located on a pallet. Each of the three boxes is dimensioned at block 311 of the example method 300. In particular, the controller 220 (and/or the freight dimensioner 130) dimensions one or more items represented by the second portion 1050 of the 3D scene representation 401 that remains after the first portion 1042 of the 3D scene representation 401 that corresponds to the 3D model 232 is removed. Such dimensioning occurs using any suitable dimension technique including, but not limited to, oriented bounding box techniques or 3D occupancy grid mapping.

In some example implementations, the controller 220 and/or the freight dimensioner 130 communicates data to one or more display device to render the dimensions of the items represented by the second portion 1050.

Figure 12:
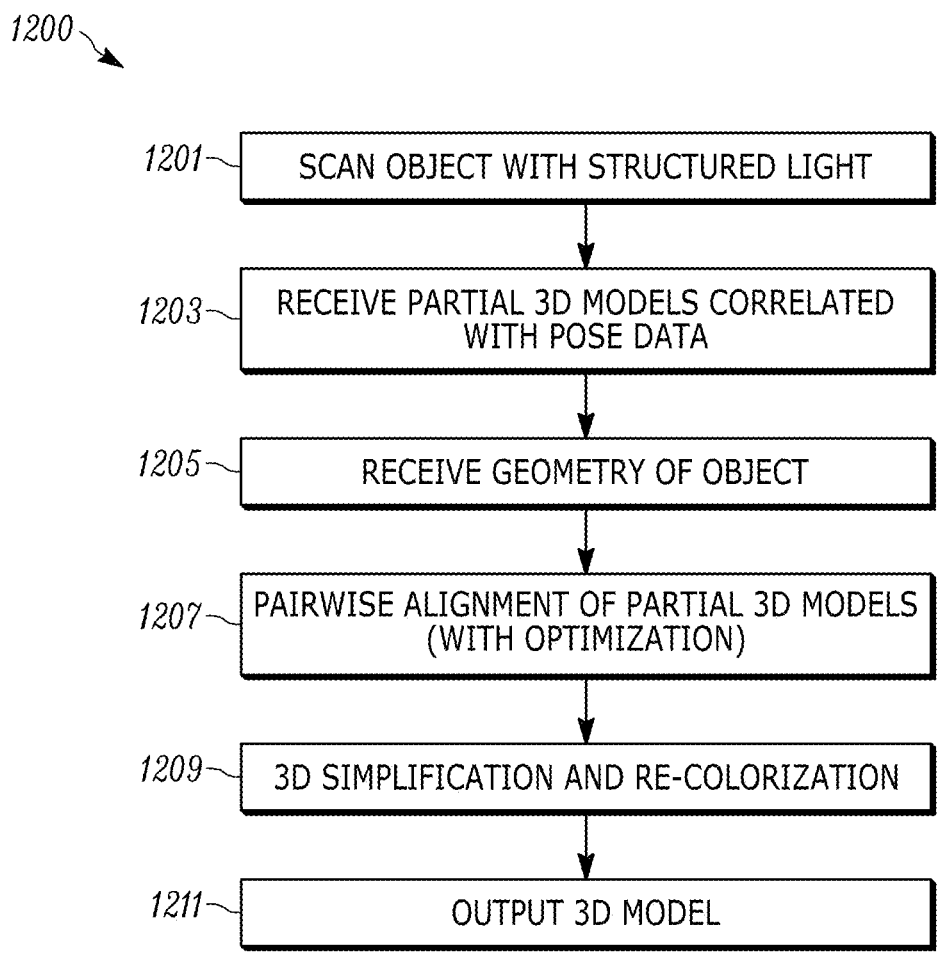
FIG. 12 a flowchart representative of an example method for determining a three-dimensional model.

Attention is now directed to FIG. 12 which depicts a flowchart representative of an example method 1200 for generating a 3D model of an object. The example operations of the example method 1200 of FIG. 12 correspond to machine readable instructions that are executed by, for example, the platform 132 of FIG. 2, and specifically by the controller 220 of the platform 132 and/or by the freight dimensioner 130. In the illustrated example, the instructions represented by the blocks of FIG. 12 are stored at the memory 222, for example, as the application 223 and/or as a module of the application 223 and/or as a separate application. The example method 1200 of FIG. 12 is one way in which the platform 132 may be configured. Furthermore, the following discussion of the example method 1200 of FIG. 12 will lead to a further understanding of the platform 132, and its various components. However, it is to be understood that the platform 132 and/or the example method 1200 may be varied, and need not work exactly as discussed herein in conjunction with each other, and that such variations are within the scope of present implementations.

The example method 1200 of FIG. 12 need not be performed in the exact sequence as shown and likewise various blocks may be performed in parallel rather than in sequence. Accordingly, the elements of the example method 1200 are referred to herein as "blocks" rather than "steps." The example method 1200 of FIG. 12 may alternatively be implemented on variations of the example platform 132, the example controller 220 and/or the example freight dimensioner 130 of FIG. 2, as well.

Furthermore, it is assumed in the example method 1200 that one or more of the sensors 112 is used to image the vehicle 122 to generate the 3D model 232.

It is further assumed in the present example implementations that the controller 220 is in communication with a structured light scanner, for example a projector configured to project structured light onto on object including, but not limited to, the vehicle 122. Such a structured light can include, but is not limited to, a checkerboard pattern.

At block 1201, the controller 220 scans the object with the structure light, for example by controlling the structured light scanner to project structured light onto the object. Furthermore, the scanning of the object with the structured light occurs at a plurality of poses, e.g. a physical position of the object relative to a sensor scanning the object and the structured light scanner projecting the structured light. In general, each pose is represented by pose data defining these geometries. In general, it is assumed that the pose data is known and/or is determined, and hence can be interchangeably referred to as pose prior data. For example, in some example implementations, the object is scanned from a plurality of poses by a plurality of sensors 112 using one or more structured light scanners (and/or one structured light scanner is moved around the object at given positions). In other implementations, the object is rotated with respect to a single sensor 112 and a single structured light scanner, and/or the single sensor 112 and the single structured light scanner is rotated around the object.

Furthermore, each scan of the object at block 301 at each pose comprises a partial 3D model of the object at the given pose, with each partial 3D model comprising a point cloud and/or a color point cloud.

Regardless of the physical configuration of how the object is scanned, at block 1203, the controller receives the partial 3D models correlated with the pose data. It is furthermore assumed that the partial 3D models at least partially overlap, such that the partial 3D models are combinable into the 3D model 232 of the object.

At block 1205, the controller 220 receives the geometry of the object, for example 3D dimensions of the object. In some of these implementations, the geometry of the object comprises a length, a width and a height of the object, without regard to details of features of the object (e.g. a longest length from front to back, a widest width from side-to-side, and a tallest height from top-to-bottom). In some example implementations, the geometry of the object is used to determine a bounding box of the 3D model 232. Furthermore, in some of these implementations, when the object (and/or the vehicle 122) defines a forklift, the geometry of the object defines a geometry that excludes the forks of the forklift to simplify the 3D model 232. In some implementations, the geometry of the object includes a position of a region corresponding to the 2D image 234.

At block 1207, the controller 220 performs a pairwise alignment of the partial 3D models. In some of these implementations, the controller 220 also performs optimization before, during and/or after the pairwise alignment, the optimization including, but not limited to one or more of: a 3D Hough transformation, geometry consistence clustering, iterative closest point registration refinement and 3D hypothesis verification.

For example, at the block 1207, the controller 220 compares the partial 3D models to determine pairs of points in each respective point cloud that align with each other and/or correspond with each other. Such alignment and/or correspondence need not be exact alignment and/or correspondence; rather such alignment and/or correspondence comprises determining points in each of the partial 3D models which are adjacent to each other and/or overlap with each other, to combine them into the 3D model 232. The respective pose data is used to determine the relative positions of each of the partial 3D models to each other when performing the pairwise alignment.

In some example implementations, at block 1209, the controller 220 performs a 3D simplification and re-colorization of the output from the block 1207; for example, at block 1209, excess points and/or outliers are removed, and color is normalized in the combined regions of the partial 3D models (e.g. to account for differences in color between the partial 3D models, which can occur to differences in illumination of the object during the scanning of the block 1201 and/or due to differences in color sensing by the sensors 112 using the scanning of the block 1201).

At block 1211, the 3D model 232 is output, for example by storing the 3D model at the memory 222, as depicted in FIG. 2.

Figure 13:
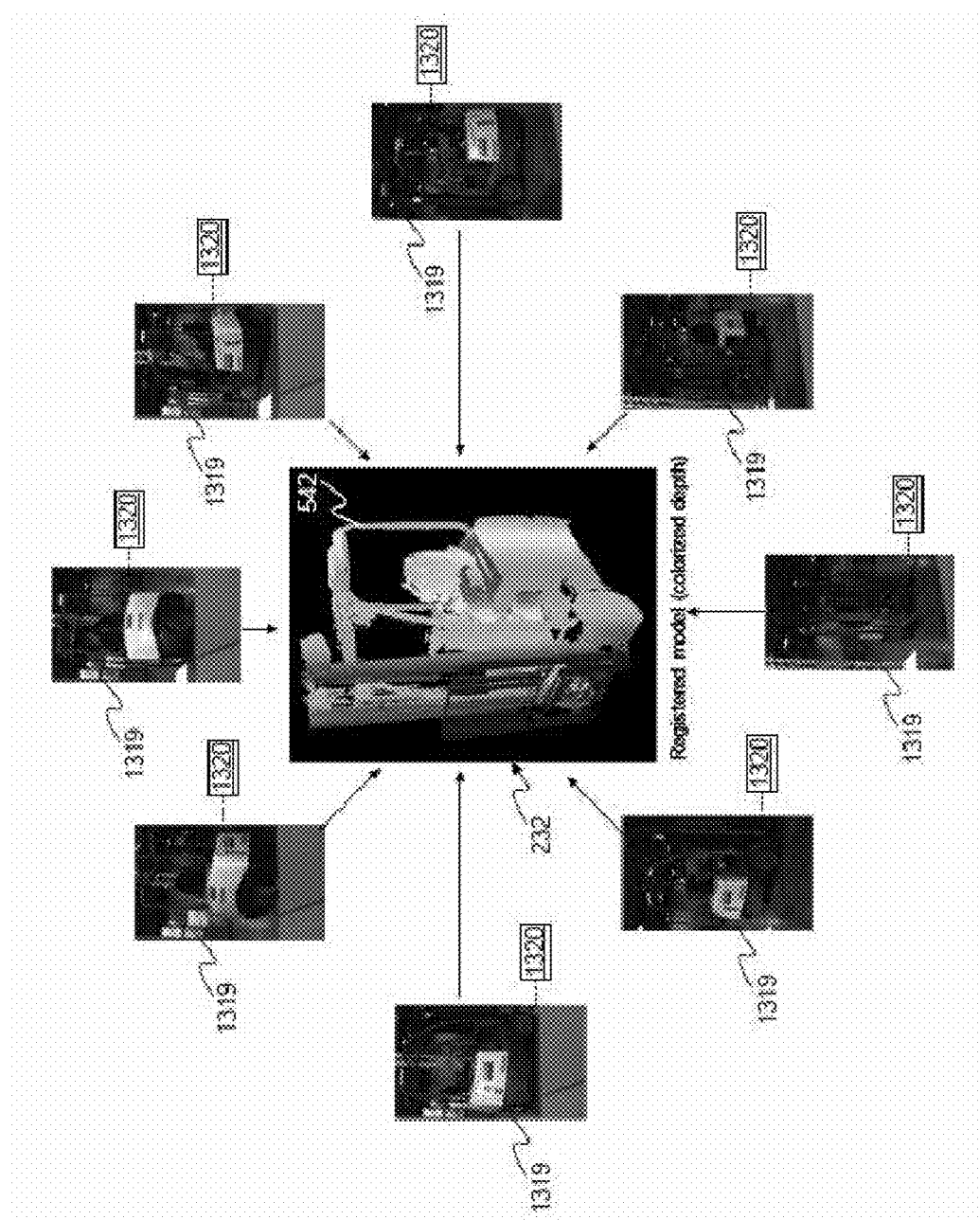
FIG. 13 depicts an example implementation of the method of FIG. 12.

Attention is next directed to FIG. 13 which depicts an example schematic implementation of at least a portion of the example method 1200. In particular, FIG. 13 depicts a plurality of images 1319 each corresponding to a partial 3D model acquired at the block 1201 of the method 1200. For example, each of the images 1319 comprises a flattened 2D image a respective partial 3D model. Furthermore, each of the images 1319 is associated with respective pose data 1320, which defines a pose at which the associated partial 3D model was acquired. As depicted, each of the flattened 2D images 1319 includes a different view of a forklift. Furthermore, the associated partial 3D models are combined into the 3D model 232. As depicted, the 3D model 232 includes only the first subset 542 and hence excludes the forks of the forklift. Indeed, in some example implementations, the geometry of the object received at the block 1205 is used to exclude the forks of the forklift from the 3D model 232, as described above.

Furthermore, at one or more of the blocks 1201, 1203, 1207, 1209, a background is removed.

In general, the resulting example 3D model 232 depicted in FIG. 13 comprises a high-resolution 3D model along with a color texture map of a forklift constructed from multi-view scans using the structured light scanner.

In some example implementations, the example method 1200 further comprises determining the 2D matching data 236, for example, at any of the blocks 1203, 1207, 1209, 1211 and/or at a separate block. For example, the process depicted in FIG. 7 is performed on the 3D model 232 output at the block 1211 and/or at any other block where a matching of the 2D model 232 can occur with the partial 3D models (represented by the images 1319) and the like.

In yet further implementations, the 2D matching data 236 includes a 2D matching between features in the 2D image 234, and one of the images 1319 (e.g. that includes a region corresponding to the 2D image 234) which is further matched back to the point cloud of the 3D model 232.

Figure 14:
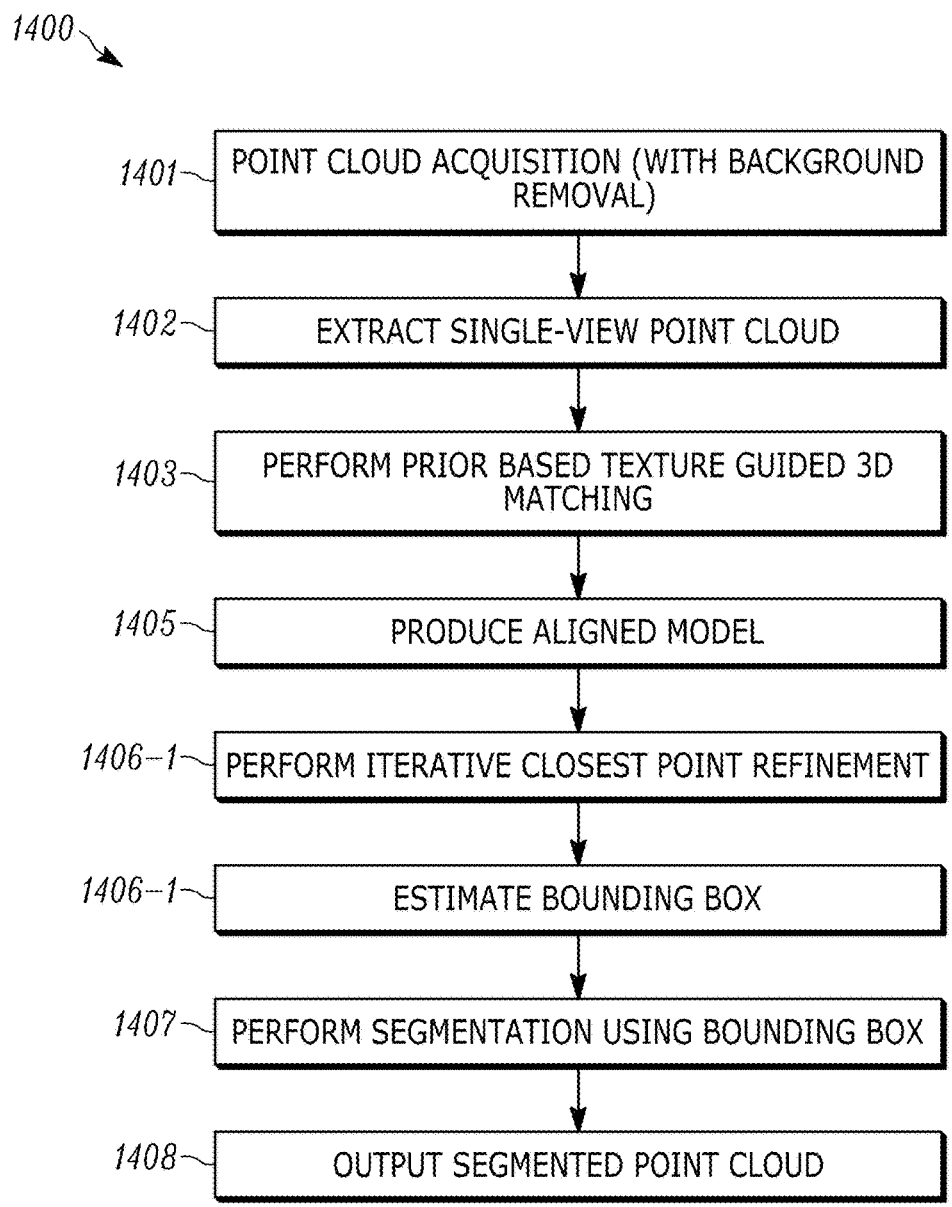
FIG. 14 is a flowchart representative of an alternative example method for segmenting an object.

Attention is now directed to FIG. 14 which depicts a flowchart representative of an example method 1400 for segmenting objects. The example operations of the example method 1400 of FIG. 14 correspond to machine readable instructions that are executed by, for example, the platform 132 of FIG. 2, and specifically by the controller 220 of the platform 132 and/or by the freight dimensioner 130. In the illustrated example, the instructions represented by the blocks of FIG. 14 are stored at the memory 222, for example, as the application 223. The example method 1400 of FIG. 14 is one way in which the platform 132 may be configured. Furthermore, the following discussion of the example method 1400 of FIG. 14 will lead to a further understanding of the platform 132, and its various components. However, it is to be understood that the platform 132 and/or the example method 1400 may be varied, and need not work exactly as discussed herein in conjunction with each other, and that such variations are within the scope of present implementations.

The example method 1400 of FIG. 14 need not be performed in the exact sequence as shown and likewise various blocks may be performed in parallel rather than in sequence. Accordingly, the elements of the example method 1400 are referred to herein as "blocks" rather than "steps." The example method 1400 of FIG. 14 may alternatively be implemented on variations of the example platform 132, the example controller 220 and/or the example freight dimensioner 130 of FIG. 2, as well.

Furthermore, it is assumed in the example method 1400 is similar to method 300 with similar blocks having like numbers, however in a "1400" series rather than a "300" series; hence, for example, block 1401 of the example method 1400 is similar to the block 301 of the example method 300.

At block 1401, the controller 220 acquires a point cloud similar to the 3D representation 401 acquired at the block 301. In addition, at block 1401, the controller 220 performs a background removal to remove features not associated with object being represented by the point cloud. In some example implementations, the point cloud is acquired in a process similar to that described with reference to FIG. 12 and FIG. 13, using sensors 112 and when the object is in the imaging area 120.

At block 1402, the controller 220 extracts a single-view point cloud from the point cloud acquired at the block 1401. For example, the single-view point cloud corresponds to data from one of the sensors 112 used to generate the point cloud at block 1401. It is assumed that the single-view point cloud extracted at block 1402 includes a region corresponding to the 2D image 234. In some example implementations, the single-view point cloud is extracted based on the 3D partial models acquired at the block 1203 of the example method 1200. For example, in some of these implementations, when generating the 3D model 232 using the example method 1200, a pose at which a region corresponding to the 2D image 234 is viewable by a sensor 112 is determined and a single-view point cloud corresponding to this pose is extracted from the point cloud acquired at the block 1401. Furthermore, in some examples, the extracting of the single-view point cloud occurs in conjunction with determining a direction of travel of an object represented by the point cloud acquired at the block 1401, as described above.

At block 1403, the controller 220 performs prior based texture guided 3D matching to, for example, determine an orientation of the 2D image 234 in the 3D scene representation 401, similar to the block 303 of the example method 300. However, at the block 1403, the prior based texture guided 3D matching occurs between the 2D image 234 and the single-view point cloud extracted at the block 1402.

In particular, in some example implementations, at the block 1403, the controller 220 collapses the single-view point cloud extracted at the block 1403 into a 2D representation (e.g. similar to one of images 1319) and performs a 2D matching between the 2D image 234 and the 2D representation, in order to match features there between.

At block 1405, the controller 220 aligns the 3D model 232 with the point cloud using, for example, the prior based texture guided 3D matching of the block 1403 and the predetermined matching data 236. In some example implementations, the block 1405 includes use of a transformation matrix to transform the 3D model 232 to the point cloud, for example to orient the 3D model to the point cloud. For example, the prior based texture guided 3D matching of the block 1403 and the predetermined matching data 236 are used to generate a transformation matrix which is used to perform the alignment.

In some example implementations, the controller 220 performs the alignment by initially performing a 2D matching between a portion of the 3D model 232 and the 2D representation produced from the collapsed single-view point cloud described above. For example, one of the images 1319 is used to perform a 2D matching, which is subsequently used to produce a 3D alignment between the 3D model 232 and the point cloud acquired at the block 1401.

At block 1406-1, the controller 220 performs an iterative closest point (ICP) refinement to further refine the alignment of the 3D model 232 to the point cloud. At block 1406-2, the controller 220 estimates the bounding box 1060 as described above.

At block 1407, the controller 220 performs a segmentation using the output from the ICP refinement of the block 1406-1, similar to the segmentation of the block 307, and depicted in FIG. 10. At block 1408, the controller 220 outputs a segmented point cloud, similar to that depicted in FIG. 11, which is subsequently dimensioned.

Figure 15:
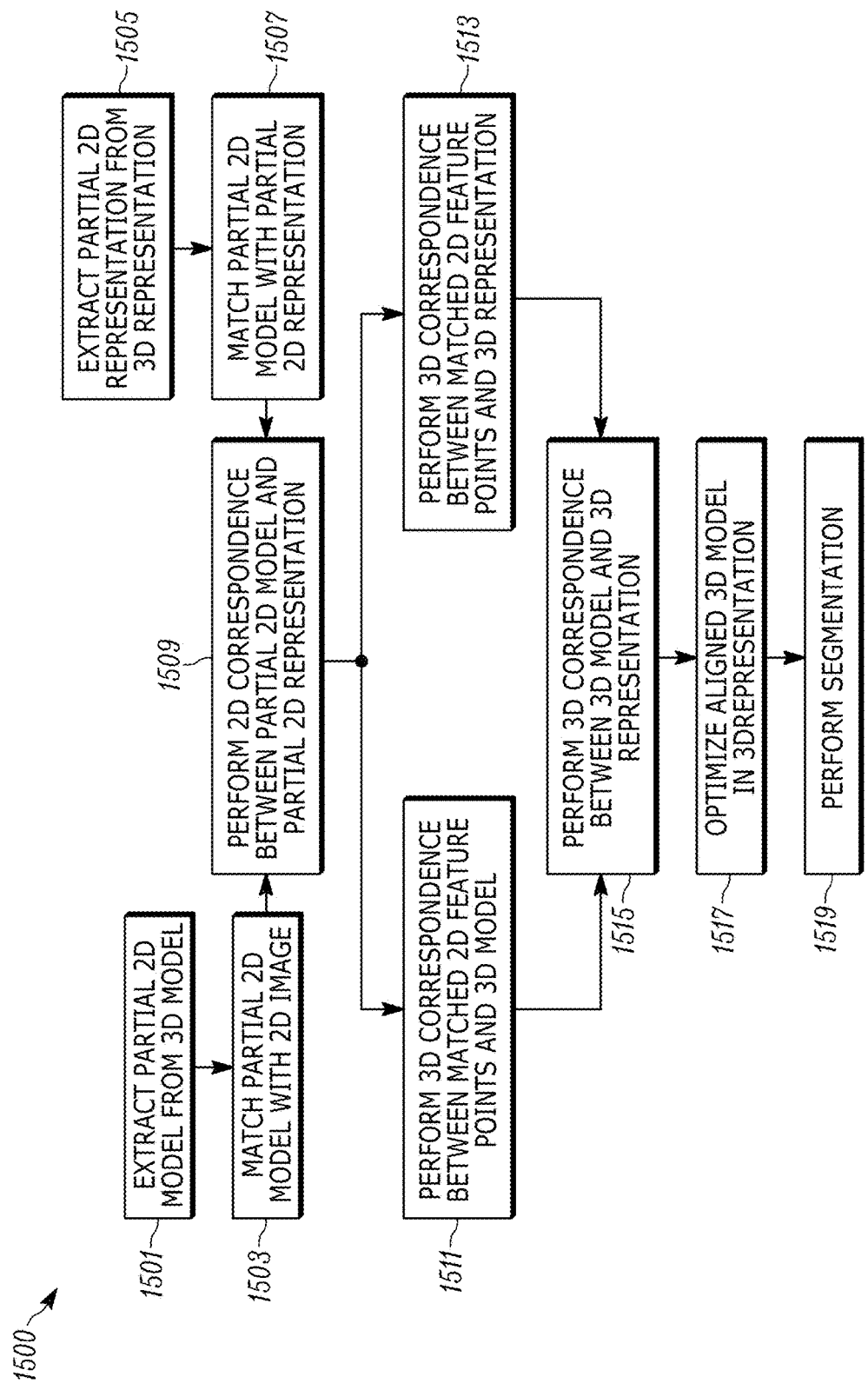
FIG. 15 is a flowchart representative of an alternative example method for segmenting an object.

In the description of the example method 1400, matching between the 2D image 234 and the 3D model 232, as well as matching between the 2D image 234 and the 3D scene representation 401 was described at least partially with respect to a 2D matching scheme. Such a 2D matching scheme is described with respect to FIG. 15 which depicts a flowchart representative of an example method 1500 for segmenting objects. The example operations of the example method 1500 of FIG. 15 correspond to machine readable instructions that are executed by, for example, the platform 132 of FIG. 2, and specifically by the controller 220 of the platform 132 and/or by the freight dimensioner 130. In the illustrated example, the instructions represented by the blocks of FIG. 15 are stored at the memory 222, for example, as the application 223. The example method 1500 of FIG. 15 is one way in which the platform 132 may be configured. Furthermore, the following discussion of the example method 1500 of FIG. 15 will lead to a further understanding of the platform 132, and its various components. However, it is to be understood that the platform 132 and/or the example method 1500 may be varied, and need not work exactly as discussed herein in conjunction with each other, and that such variations are within the scope of present implementations.

The example method 1500 of FIG. 15 need not be performed in the exact sequence as shown and likewise various blocks may be performed in parallel rather than in sequence. Accordingly, the elements of the example method 1500 are referred to herein as "blocks" rather than "steps." The example method 1500 of FIG. 15 may alternatively be implemented on variations of the example platform 132, the example controller 220 and/or the example freight dimensioner 130 of FIG. 2, as well.

At block 1501, the controller extracts a partial 2D model from the 3D model 232, for example by selecting one of the partial 3D models received at the block 1203 of the example method 1200 and collapsing the selected partial 3D model into a partial 2D model, such as an image 1319 depicted in FIG. 13. The extraction of the partial 2D model is one or more of: performed iteratively in conjunction with block 1503, described hereafter; and performed based on a geometry of the object represented by the 3D model 232 that indicates a position of a region that includes a region corresponding to the 2D image 234.

At block 1503, the controller 220 matches the partial 2D model extracted at the block 1501 with the 2D image 234 using feature matching techniques described heretofore. In some example implementations, also at the block 1503, the controller 220 generates the predetermined matching data 236 and stores the predetermined matching data 236 at the memory 222. Hence, the blocks 1501, 1503 are generally not performed "live", but rather are performed before an object (such as the vehicle 122 carrying the item 124) is imaged using the sensors 112.

At the block 1505, the controller 220 extracts a partial 2D representation from the 3D representation 401, assuming that the block 301 of the example method 300 has been performed. The block 1505 is performed in a manner similar to the block 1501. Alternatively, the block 1505 is performed by determining a direction of travel as described above.

At the block 1507, the controller 220 matches the partial 2D representation extracted at the block 1505 with the 2D image 234 using feature matching techniques described heretofore.

At the block 1509, the controller 220 performs a 2D correspondence between the partial 2D model and the partial 2D representation based on the blocks 1503, 1507. Hence, the matching of the 2D image 234 with each of the partial 2D model and the partial 2D representation is used to match features in the corresponding regions of each of the partial 2D model and the partial 2D representation that correspond to the 2D image 234. However, alignment of the 3D model 232 at the 3D representation 401 has yet to occur.

Hence, at block 1511, the controller 220 performs a 3D correspondence between the 2D features of the partial 2D model matched at the block 1509 with the 3D model 232. Hence, for example, the controller 220 determines where the matched 2D features of the block 1509 are located in the 3D model 232.

Similarly, at block 1513, the controller 220 performs a 3D correspondence between the 2D features of the partial 2D representation matched at the block 1509 with the 3D representation 401. Hence, for example, the controller 220 determines where the matched 2D features of the block 1509 are located in the 3D representation 401.

The correspondences determined at each of the blocks 1511, 1513 are used by the controller 220, at block 1515, to perform a 3D correspondence between the 3D model 232 and the 3D representation 401. Hence, the blocks 1505 to 1515 represent a particular example implementation of the blocks 303, 305 of the example method 300 and/or a particular example implementation of the blocks 1401 to 1405 of the example method 1400.

At block 1517, the controller 220 optimizes the combination of the 3D model 232 aligned at the 3D representation 401 using, for example, one or more of: 3D Hough transformation, geometry consistence clustering, iterative closest point registration refinement and 3D hypothesis verification, and/or any other optimization technique.

At block 1519, the controller 220 performs the segmentation as described above with respect to the blocks 307, 1407, and FIG. 10 and FIG. 11.

In the foregoing specification, specific implementations have been described. However, one of ordinary skill in the art appreciates that various modifications and changes may be made without departing from the scope of the specification. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

In this document, language of "at least one of X, Y, and Z" and "one or more of X, Y and Z" may be construed as X only, Y only, Z only, or any combination of two or more items X, Y, and Z (e.g., XYZ, XY, XZ, YZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method of dimensioning items, comprising:
   receiving, at a controller, from one or more sensors, a three-dimensional (3D) representation of a scene that includes an object represented by a 3D model;
   determining, at the controller, an orientation of a 2D image in the 3D representation by matching the 2D image with a corresponding region of the 3D representation;
   determining, at the controller, a first portion of the 3D representation that corresponds to a subset of the 3D model of the object from:
      the orientation of the 2D image in the 3D representation; and
      predetermined matching data representative of a matching of the 2D image with a respective corresponding region of the 3D model, each of the 3D model, the 2D image, and the predetermined matching data stored in a memory accessible to the controller;
   segmenting, at the controller, the first portion of the 3D representation from a second portion of the 3D representation, wherein the segmenting the first portion of the 3D representation from the second portion of the 3D representation includes removing the first portion of the 3D representation that corresponds to the subset of the 3D model; and
   dimensioning one or more items represented by the second portion of the 3D representation that remains after the first portion of the 3D representation that corresponds to the 3D model is removed.

2. The method of claim 1, wherein the 3D representation of the scene comprises one or more of a point cloud, color data associated with the point cloud, and a color point cloud.

3. The method of claim 1, wherein each of the determining the orientation of the 2D image in the 3D representation, and the determining the first portion of the 3D representation that corresponds to a subset of the 3D model of the object includes 3D point cloud feature matching and color feature matching.

4. The method of claim 1, wherein the 3D representation of the scene comprises a plurality of images from the one or more sensors, and the matching of the 2D image with a corresponding region of the 3D representation comprises performing a 2D matching between the 2D image and one image of the plurality of images.

5. The method of claim 4, further comprising determining a direction of travel of the object in the scene, and determining the one image of the plurality of images to use in the 2D matching from the direction of travel.

6. The method of claim 1, further comprising optimizing the 3D representation by one or more of: a 3D Hough transformation, geometry consistence clustering, iterative closest point registration refinement and 3D hypothesis verification.

7. The method of claim 1, wherein the segmenting the first portion of the 3D representation from the second portion includes determining a bounding box of the subset of the 3D model in the 3D representation and removing data corresponding to the bounding box from the 3D representation.

8. The method of claim 1, wherein the 2D image comprises a representation of markings on the object, the markings including one or more of a logo, a given portion of the object, a feature-rich image, and a unique portion of the object.

9. The method of claim 1, wherein the 3D model of the object comprises a 3D model of a forklift, and the subset of the 3D model excludes forks of the forklift.

10. A device for dimensioning items, comprising:
a controller, and a communication interface, the controller configured to:
receive, using the communication interface, from one or more sensors, a three-dimensional (3D) representation of a scene that includes an object represented by a 3D model;
determine an orientation of a 2D image in the 3D representation by matching the 2D image with a corresponding region of the 3D representation;
determine a first portion of the 3D representation that corresponds to a subset of the 3D model of the object from:
the orientation of the 2D image in the 3D representation; and
predetermined matching data representative of a matching of the 2D image with a respective corresponding region of the 3D model, each of the 3D model, the 2D image, and the predetermined matching data stored in a memory accessible to the controller;
segment the first portion of the 3D representation from a second portion of the 3D representation by removing the first portion of the 3D representation that corresponds to the subset of the 3D model; and
dimension one or more items represented by the second portion of the 3D representation that remains after the first portion of the 3D representation that corresponds to the 3D model is removed.

11. The device of claim 10, wherein each of determining the orientation of the 2D image in the 3D representation, and determining the first portion of the 3D representation that corresponds to a subset of the 3D model of the object includes: 3D point cloud feature matching and color feature matching.

12. The device of claim 10, wherein the 3D representation of the scene comprises a plurality of images from the one or more sensors, and the controller is further configured to match the 2D image with a corresponding region of the 3D representation by performing a 2D matching between the 2D image and one image of the plurality of images.

13. The device of claim 12, the controller is further configured to determine a direction of travel of the object in the scene, and determine the one image of the plurality of images to use in the 2D matching from the direction of travel.

14. The device of claim 10, the controller is further configured to optimize the 3D representation by one or more of: a 3D Hough transformation, geometry consistence clustering, iterative closest point registration refinement and 3D hypothesis verification.

15. The device of claim 10, the controller is further configured to segment the first portion of the 3D representation from the second portion by determining a bounding box of the subset of the 3D model in the 3D representation and removing data corresponding to the bounding box from the 3D representation.

16. A non-transitory computer-readable medium storing a computer program, wherein execution of the computer program causes a machine to perform operations comprising:
receiving, at a controller, from one or more sensors, a three-dimensional (3D) representation of a scene that includes an object represented by a 3D model;
determining, at the controller, an orientation of a 2D image in the 3D representation by matching the 2D image with a corresponding region of the 3D representation;
determining, at the controller, a first portion of the 3D representation that corresponds to a subset of the 3D model of the object from: the orientation of the 2D image in the 3D representation; and predetermined matching data representative of a matching of the 2D image with a respective corresponding region of the 3D model, each of the 3D model, the 2D image, and the predetermined matching data stored in a memory accessible to the controller;
segmenting, at the controller, the first portion of the 3D representation from a second portion of the 3D representation by removing the first portion of the 3D representation that corresponds to the subset of the 3D model; and
dimensioning one or more items represented by the second portion of the 3D representation that remains after the first portion of the 3D representation that corresponds to the 3D model is removed.

* * * * *